(12) United States Patent
Chowdhury et al.

(10) Patent No.: US 9,317,568 B2
(45) Date of Patent: Apr. 19, 2016

(54) POPULARITY OF CONTENT ITEMS

(71) Applicant: AOL Inc., Dulles, VA (US)

(72) Inventors: Abdur R. Chowdhury, Oakton, VA (US); Harmannus Vandermolen, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 130 days.

(21) Appl. No.: 13/750,202

(22) Filed: Jan. 25, 2013

(65) Prior Publication Data

US 2013/0185289 A1    Jul. 18, 2013

Related U.S. Application Data

(63) Continuation of application No. 11/555,526, filed on Nov. 1, 2006, now Pat. No. 8,364,669.

(60) Provisional application No. 60/820,017, filed on Jul. 21, 2006, provisional application No. 60/821,356, filed on Aug. 3, 2006.

(51) Int. Cl.
    *G06F 17/30*    (2006.01)
    *F16N 31/00*    (2006.01)

(52) U.S. Cl.
    CPC ........ *G06F 17/30554* (2013.01); *F16N 31/004* (2013.01); *G06F 17/3064* (2013.01)

(58) Field of Classification Search
    CPC .......... G06F 17/3064; G06F 17/30646; G06F 17/30648; G06F 17/30554
    See application file for complete search history.

(56) References Cited

U.S. PATENT DOCUMENTS

| | | |
|---|---|---|
| 5,751,286 A | 5/1998 | Barber et al. |
| 5,828,839 A | 10/1998 | Moncreiff |
| 5,835,087 A | 11/1998 | Herz et al. |
| 6,049,806 A | 4/2000 | Crecine |
| 6,112,203 A | 8/2000 | Bharat et al. |
| 6,385,602 B1 | 5/2002 | Tso et al. |
| 6,601,061 B1 | 7/2003 | Holt et al. |
| 6,640,218 B1 | 10/2003 | Golding et al. |
| 6,681,370 B2 | 1/2004 | Gounares et al. |
| 6,691,106 B1 | 2/2004 | Sathyanarayan |
| 6,823,370 B1 | 11/2004 | Kredo et al. |
| 6,901,207 B1 | 5/2005 | Watkins |

(Continued)

OTHER PUBLICATIONS

U.S. Appl. No. 11/548,055, filed Oct. 10, 2006, 47 pages.

(Continued)

*Primary Examiner* — Leslie Wong
(74) *Attorney, Agent, or Firm* — Finnegan, Henderson, Farabow, Garrett & Dunner, L.L.P.

(57) ABSTRACT

Search results may be yielded based on a search query. A search query inspired by a user may be received. Based on the search query, multiple search results each including links may be determined. The multiple search results may include a first search result that includes a link to a first digital instance that describes or embodies a first content item, and a second search result that includes a link to a second digital instance that describes or embodies a second content item. A perceived popularity may be assessed for each of the first and second content items. The perceived popularity may be a measure of the popularity of the first and second content items, and may be distinct from a popularity of the first and second digital instances. A presentation of the multiple search results may be determined based on the accessed perceived popularity.

19 Claims, 14 Drawing Sheets

| Song | Artist | CD1 | CD2 | Popularity |
|---|---|---|---|---|
| Breathe | Blu Cantrell | Bittersweet | | 40 |
| Breathe | Faith Hill | Breathe | | 110 |
| Breathe | Fabolous | Real Talk | | 125 |
| Breathe | Greenwheel | Soma Holiday | | 50 |
| Breathe | Melissa Etheridge | Lucky | | 25 |
| Breathe (2 AM) | Anna Nalik | | | 75 |
| Breathe No More | Evanescence | Anywhere But Home | Elektra Soundtrack | 80 |
| Big Yellow Taxi | Amy Grant | House of Love | Greatest Hits | 75 |
| Big Yellow Taxi | Counting Crows | Best Of | | 150 |
| Big Yellow Taxi | Joni Mitchell | Ladies of the Canyon | | 100 |
| Big Yellow Taxi | Pinhead Gunpowder | Jump Salty | | |
| Holiday | Green Day | American Idiot | | 105 |
| Holiday | Madonna | Madonna | The Wedding Singer | 75 |

(56) References Cited

U.S. PATENT DOCUMENTS

| | | | |
|---|---|---|---|
| 6,963,867 B2 | 11/2005 | Ford et al. | |
| 7,209,942 B1 | 4/2007 | Hori et al. | |
| 7,209,952 B2 | 4/2007 | Fong et al. | |
| 7,281,220 B1 | 10/2007 | Rashkovskiy | |
| 7,367,043 B2 | 4/2008 | Dudkiewicz et al. | |
| 7,440,976 B2 | 10/2008 | Hart et al. | |
| 7,624,103 B2 | 11/2009 | Wiegering et al. | |
| 7,689,682 B1 | 3/2010 | Eldering et al. | |
| 7,739,271 B2* | 6/2010 | Cook et al. | 707/722 |
| 7,774,341 B2* | 8/2010 | Aravamudan et al. | 707/731 |
| 7,801,889 B2* | 9/2010 | Kim et al. | 707/731 |
| 8,260,771 B1* | 9/2012 | Ortega et al. | 707/723 |
| 8,364,669 B1* | 1/2013 | Chowdhury et al. | 707/726 |
| 2002/0069218 A1 | 6/2002 | Sull et al. | |
| 2002/0082901 A1 | 6/2002 | Dunning et al. | |
| 2002/0133826 A1 | 9/2002 | Ohyama | |
| 2002/0152278 A1* | 10/2002 | Pontenzone et al. | 709/217 |
| 2002/0184336 A1 | 12/2002 | Rising, III | |
| 2003/0004781 A1 | 1/2003 | Mallon et al. | |
| 2003/0014403 A1 | 1/2003 | Chandrasekar et al. | |
| 2003/0093790 A1 | 5/2003 | Logan et al. | |
| 2003/0182220 A1 | 9/2003 | Galant | |
| 2003/0195877 A1* | 10/2003 | Ford et al. | 707/3 |
| 2003/0235407 A1 | 12/2003 | Lord | |
| 2004/0098754 A1 | 5/2004 | Vella et al. | |
| 2004/0114571 A1 | 6/2004 | Timmins et al. | |
| 2004/0186828 A1 | 9/2004 | Yadav et al. | |
| 2005/0091694 A1 | 4/2005 | Rambo | |
| 2005/0114324 A1 | 5/2005 | Mayer | |
| 2005/0114449 A1 | 5/2005 | Verhaeghe et al. | |
| 2005/0128361 A1 | 6/2005 | Li et al. | |
| 2005/0144086 A1 | 6/2005 | Speiser et al. | |
| 2005/0160082 A1* | 7/2005 | Dawson | 707/3 |
| 2005/0197906 A1 | 9/2005 | Kindig et al. | |
| 2006/0059134 A1 | 3/2006 | Palmon et al. | |
| 2006/0071950 A1 | 4/2006 | Kurzweil et al. | |
| 2006/0167857 A1 | 7/2006 | Kraft et al. | |
| 2006/0167864 A1 | 7/2006 | Bailey et al. | |
| 2006/0179051 A1 | 8/2006 | Whitney et al. | |
| 2006/0195790 A1* | 8/2006 | Beaupre et al. | 715/727 |
| 2006/0218573 A1 | 9/2006 | Proebstel | |
| 2006/0224552 A1 | 10/2006 | Riezler et al. | |
| 2006/0242554 A1 | 10/2006 | Gerace et al. | |
| 2007/0005564 A1 | 1/2007 | Zehner | |
| 2007/0038620 A1 | 2/2007 | Ka et al. | |
| 2007/0088603 A1 | 4/2007 | Jouppi et al. | |
| 2007/0094247 A1 | 4/2007 | Chowdhury et al. | |
| 2007/0101365 A1 | 5/2007 | Clark et al. | |
| 2007/0112817 A1 | 5/2007 | Danninger | |
| 2007/0130563 A1 | 6/2007 | Elgazzar et al. | |
| 2007/0156677 A1 | 7/2007 | Szabo | |
| 2007/0174237 A1 | 7/2007 | Wilbrink et al. | |
| 2007/0208719 A1 | 9/2007 | Tran | |
| 2007/0226183 A1 | 9/2007 | Hart et al. | |
| 2007/0233736 A1 | 10/2007 | Xiong et al. | |
| 2007/0250468 A1 | 10/2007 | Pieper | |
| 2007/0261099 A1 | 11/2007 | Broussard et al. | |
| 2007/0276733 A1* | 11/2007 | Geshwind et al. | 705/14 |
| 2007/0300258 A1 | 12/2007 | O'Connor et al. | |
| 2008/0005118 A1 | 1/2008 | Shakib et al. | |
| 2008/0077568 A1 | 3/2008 | Ott | |
| 2008/0086379 A1* | 4/2008 | Dion et al. | 705/14 |
| 2008/0155627 A1 | 6/2008 | O'Connor et al. | |
| 2010/0094878 A1* | 4/2010 | Soroca et al. | 707/748 |
| 2010/0114882 A1 | 5/2010 | Wiegering et al. | |

OTHER PUBLICATIONS

Final Office Action in U.S. Appl. No. 11/548,055, mailed Apr. 1, 2009, 41 pages.

Final Office Action in U.S. Appl. No. 11/538,383, mailed Jul. 21, 2009, 32 pages.

Notice of Allowance in U.S. Appl. No. 11/538,620, mailed Jul. 13, 2009, 11 pages.

Notice of Allowance in U.S. Appl. No. 11/538,729, mailed Jul. 15, 2009, 8 pages.

International Preliminary Report on Patentability issued in PCT/US2007/073999, dated Jan. 7, 2009, 4 pages.

Baker L. "Blinkx. TV: More Video Than Google Yahoo or YouTube" Search Engine Journal, Jun. 14, 2006, pp. 1-7, http://www.searchenginjournal.com/blinkxtv-more-video-than-google-yahoo-or-myspace/3532/(visited Mar. 5, 2008).

International Search Report issued an International Application No. PCT/US07/73999, dated Jul. 7, 2008, 8 pages.

Adamic et al., "how to search a social network" social networks 27 (2005) 187-203, HP Labs, 1501 Page Mill Road, Palo Alto, CA 94304, USA www.esevier.com/locate/socnet © 2005 Elsevier B.V.

Sebastiani, F. 1999 Machine Learning in Automated Text Categorization, Technical Report. UMI Order No. 1999-B4-31-12, Centre National de la Recherche Scientifique. 47 pages.

Agichtein et al., *Improving Web Search Ranking by Incorporating User Behavior Information*, SIGIR '06, Aug. 6-11, 2006, Seattle, Washington, USA Copyright 2006 ACM, pp. 19-26.

Joho et al., *Effectiveness of Additional Representations for the Search Result Presentation of the Web*, Joho, H. and Jose, J. M. (2005). A Comparative Study of the Effectiveness of Search Results Presentation on the Web. In: Lalmas, M., et al. (Eds.) Advances in Information Retrieval, 28$^{th}$ European Conference on Information Retrieval, pp. 302-313.

Lang, "*A tolerance Rough Set Approach to Clustering Web Search Results*" Institute of Mathematics Faculty of Mathematics, Informatics and Mechanics Warsaw University, Dec. 2003, pp. 1-77.

* cited by examiner

| Song | Artist | CD1 | CD2 | Popularity |
|---|---|---|---|---|
| Breathe | Blu Cantrell | Bittersweet | | 40 |
| Breathe | Faith Hill | Breathe | | 110 |
| Breathe | Fabolous | Real Talk | | 125 |
| Breathe | Greenwheel | Soma Holiday | | 50 |
| Breathe | Melissa Etheridge | Lucky | | 25 |
| Breathe (2 AM) | Anna Nalik | | | 75 |
| Breathe No More | Evanescence | Anywhere But Home | Elektra Soundtrack | 80 |
| Big Yellow Taxi | Amy Grant | House of Love | Greatest Hits | 75 |
| Big Yellow Taxi | Counting Crows | Best Of | | 150 |
| Big Yellow Taxi | Joni Mitchell | Ladies of the Canyon | | 100 |
| Big Yellow Taxi | Pinhead Gunpowder | Jump Salty | | |
| Holiday | Green Day | American Idiot | | 105 |
| Holiday | Madonna | Madonna | The Wedding Singer | 75 |

POPULARITY OF CONTENT ITEMS

CROSS REFERENCE TO RELATED APPLICATIONS

This is a continuation of U.S. patent application Ser. No. 11/555,526, filed Nov. 1, 2006, which claims the benefit of U.S. Provisional Application No. 60/820,017, filed Jul. 21, 2006 and U.S. Provisional Application No. 60/821,356, filed Aug. 3, 2006. The entire contents of the above-referenced applications are expressly incorporated herein by reference.

TECHNICAL FIELD

This description relates to popularity of electronic content items.

BACKGROUND

Users seeking information can search for the information on the Internet. To do so, the user enters a search query into a search engine. In response, the user receives search results that are relevant to the search query. If the user seeks search results in a particular content type or format, such as, for example, audio or video search results, a user can include one of the words "audio" or "video" in the search query along with words that relate to the content the user seeks.

SUMMARY

In a general aspect, search results are yielded based on a search query. A search query inspired by a user is received. Based on the search query, multiple search results, each including links, are determined. A first search result includes a link to a first digital instance that describes or embodies a first content item and a second search result includes a link to a second digital instance that describes or embodies a second content item. A perceived popularity is assessed for each of the first and second content items. The perceived popularity is a measure of the popularity of the first and second content items and is distinct from a popularity of the first and second digital instances that describes or embodies each of the first and second content items. A presentation of the multiple search results is determined based on the accessed perceived popularity.

With respect to at least the general aspect, implementations may include one or more of the following features. For example, the multiple search results may be displayed to the user based on the determined presentation.

A genre related to the search query inspired by the user may be received. A genre-specific catalog that is associated with the genre may be identified. The genre-specific catalog may be accessed. One or more content items stored within the genre-specific catalog that are related to the determined multiple search results may be identified. Assessing the perceived popularity for the search results may include accessing a perceived popularity for each of the identified one or more content items from within the genre-specific catalog.

An indication of a genre may be received. Multiple search results that are associated with the genre may be identified. A genre-specific catalog specific to the genre may be accessed. One or more content items may be identified from within the genre-specific catalog that relate to the identified multiple search results. A perceived popularity for the identified one or more content items may be assessed. The presentation of the multiple search results may be determined based on the assessed perceived popularity.

One content item may be selected from among the one or more content items stored within the genre-specific catalog. A perceived popularity for the content item may be formed based on information associated with the content item. Popularity search results may be determined by searching private and public networks for digital instances that include information that satisfies the popularity query. A perceived popularity may be generated for the content item based on the popularity search results. The generated perceived popularity may be associated with the content item. The association may be stored in the genre-specific catalog.

Generating a perceived popularity for the content item may include determining a raw popularity score based at least in part on a number of popularity search results received, using a classifier to analyze at least some of the received popularity search results, determining a number of popularity search results related to the genre of the catalog based on the analysis performed by the classifier, determining an ambiguity ratio that may include the determined number of popularity search results that are related to the genre of the catalog and the number of received popularity search results analyzed by the classifier, and generating a perceived popularity for the content item based on the raw popularity score and the ambiguity ratio.

The content item may be a song. The content item may be a musical album, which may be an electronic organization of songs.

Generating a perceived popularity for the musical album may include identifying songs related to the musical album, determining a perceived popularity for each of the songs, determining a preliminary perceived popularity for the musical album as a whole, and determining the perceived popularity for the musical album based on the perceived popularity for each of the songs and the preliminary perceived popularity for the musical album as a whole. The preliminary perceived popularity for the musical album as a whole may be based on popularity of the musical album without regard to popularity of individual songs included on the musical album.

The content item may be a musical artist, which may include one or more people who write or perform music.

Generating a perceived popularity for the musical artist may include identifying songs related to the musical artist, identifying musical albums related to the musical artist, determining if the musical artist may be popular for a non-music related reason, and determining individual attributes related to the non-music related reason, determining a perceived popularity for each of the songs, determining a perceived popularity for each of the musical albums, determining a perceived popularity for the musical artist based on the individual attributes related to the non-music related reason, and determining the perceived popularity for the musical artist based on the perceived popularity for each of the songs, the perceived popularity for each of the musical albums and the perceived popularity for the musical artist.

The preliminary perceived popularity for the musical artist alone may be based on popularity of the musical artist without regard to popularity of individual songs or musical albums related to the musical artist. The non-music related reason may include activism, acting, gossip, interpersonal relationships and/or tragedy. The individual attributes related to the non-music related reason may include a cause, an organizational affiliation, a television show, a movie, a commercial, a tabloid article, a famous significant other, a famous relative and/or an accident.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 8 is an illustration of a data file included in a genre-specific catalog.

FIG. 9 is an illustration of a graphical user interface (GUI) configured to provide search results for a search query based on popularity of songs associated with the search results.

FIGS. 10-12 are illustrations of GUIs configured to provide video search results based on popularity of songs associated with the video search results.

DETAILED DESCRIPTION

Figure 1A:
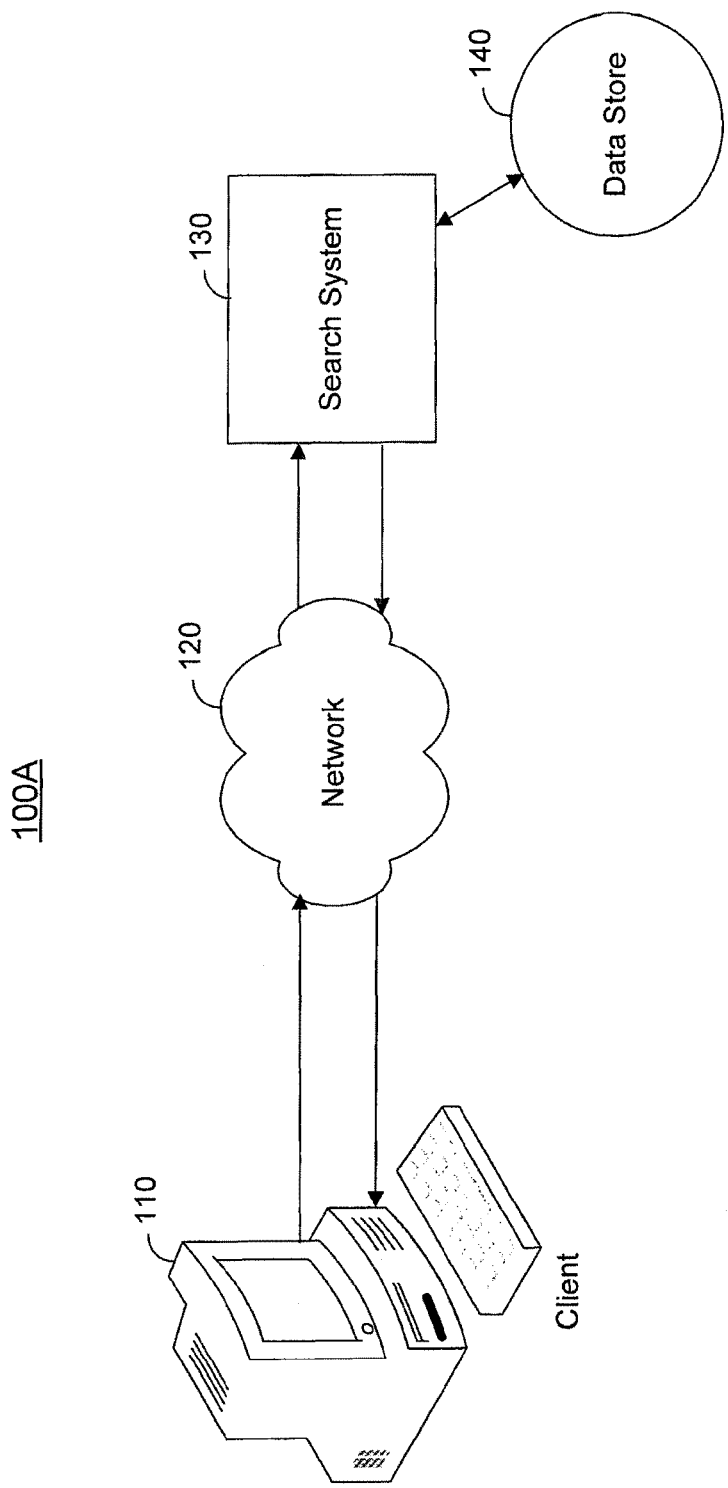
FIG. 1A is an exemplary communications system for providing search results based on popularity of content items associated with the search results.

When a user is interested in finding information about a real-world person or item on the Internet, the user submits a search query to a search engine or system. The search engine or system presents search results that correspond to the search query, each search result including a link or pointer selectable by the user to access a digital instance (e.g., a web page) that includes information that is deemed to be responsive to the user's information need, as represented by the user-inputted search query. The presentation of the search results to the user may be enhanced, particularly for users seeking audio and/or video (referred to as audio/video) information, by modifying the presentation of the search results based on a perceived popularity of the real-world person or item.

A real-world person or item may be referred to as a content item. Examples of content items include a band, a musical artist, a musical album or a song. A digital instance may be a digital asset, such as, for example, a digital audio file, a digital video file, or a web page that describes a content item (e.g., a web page that includes information about a musical artist) or embodies the content item (e.g., a digital audio file that embodies a song). A content item may be identified as being associated with a search result if the digital instance referred to by the search result describes or embodies the content item.

A perceived popularity for a content item may be one or more parameters that indicate a degree of popularity for the content item in comparison with other content items. Notably, a perceived popularity for a content item is distinct from a popularity of a digital instance. In particular, a perceived popularity is a popularity measure for a real-world person or item, which may be described by or embodied in a digital asset. A popularity of the digital instance, in contrast, is a popularity measure of the digital asset itself. For example, the singer Madonna (i.e., content item) is extremely popular world-wide; however, web pages that include information about Madonna may vary in popularity depending on factors other than the popularity of Madonna, herself (e.g., quality of information provided in the web page, number of links to the web page and notoriety of the web page authors). Consequently, assessment of the popularity of Madonna (e.g., content item) of a relatively new or obscure web page that references Madonna may be used as a basis for increasing a rank for that web page relative to other web pages that reference less popular content items (e.g., the 1980s singer Tiffany), even if those other web pages are themselves historically more frequently accessed by web users.

Search results associated with content items having higher perceived popularity may be deemed to be more likely responsive to a user's information need than search results associated with content items having lower perceived popularity. This may be the case because a search result that is associated with a more popular content item (e.g., more popular subject matter) is more likely to be responsive to a user's search query than a search result that is associated with a less popular content item. The search results deemed more likely to be responsive to the user's information need may be preferentially presented in a display over search results deemed less likely to be responsive to the user's information need.

In one implementation, search results associated with content items having a relatively high perceived popularity may be preferentially presented to the user by presenting the search results higher in a ranked list than search results associated with content items having a relatively low perceived popularity. For example, search results associated with Madonna, the nationally recognized singer of such hits as "Lucky Star", may be ranked higher than search results associated with Madonna, a lesser-known cover singer in Chicago.

A perceived popularity for a content item may be gleaned from searching, or crawling, the Internet using, for example, focus asset type crawling. The number of references to a particular content item may be used as an indicator of the popularity of the content item, and therefore, may be used to generate a perceived popularity for the content item. The search of the Internet may be improved by leveraging databases that include information related to a particular type or genre of content items for which perceived popularity are desired. For example, if the content items relate to music (e.g., bands, artists, albums and/or songs), music-related databases, such as, for example, Muse, FreeDB and All Music Guide (AMG), may be accessed to increase the reliability of detection of music-related references during the search of the Internet by increasing the chances that a detected reference to a music content item on the Internet is actually a reference to a music content item and not a reference to a content item that belongs to another genre. For example, a search of the Internet for references to the singer Madonna may be supplemented with information included in a music-related database by adjusting the search query to include additional information related to Madonna the musician, such as, for example, generic music-related words (e.g., song, music, lyric), Madonna album titles (e.g., "Ray of Light," "True Blue" and "Like a Prayer"), and Madonna song titles (e.g., "Lucky Star," "Borderline" and "Holiday"). Additionally, or alternatively, a query related to the singer Madonna may be supplemented with non-music related words (e.g., words associated with religious references to the Madonna) and an indication to stay away from those words. In this way, references related to the word "Madonna" may be identified if they are music-related references, rather than religious-related references to the Madonna.

In addition to generating perceived popularity for music-related content items, the same or analogous techniques described herein also may be applied, for example, to generating perceived popularity for sports-related content items (e.g., sports figures, teams or particular games), news-related content items (e.g., news programs, newspapers or anchors), celebrity-related content items (e.g., movies, television shows or actors) and/or politics-related content items (e.g., political issues, races or candidates/politicians), to name just a few. In some implementations, the techniques described herein may be used to enhance the presentation of search results associated with any type of information that is stored in any local or remote location, if the search results may be associated with content items that are referenced on the Internet such that a perceived popularity associated with the content items may be generated.

Communications system 100A of FIG. 1A includes a client 110 and a search system 130 that communicate through a network 120 to provide search results based on popularity of content items associated with the search results. A content item may be associated with a search result if the search result provides a link for accessing a digital instance that describes or embodies the content item.

Each of the client 110 and the search system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and search system 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the search system 130.

The client 110 may include one or more devices capable of accessing content on the search system 130. The search system 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, a media player, or another integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The network 120 includes hardware and/or software capable of enabling direct or indirect communications between the client 110 and the search system 130. As such, the network 120 may include a direct link between the client 110 and the search system 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The search system 130 may include a general-purpose computer having a central processor unit (CPU), and memory/storage devices that store data and various programs such as an operating system and one or more application programs. Other examples of a search system 130 includes a workstation, a server, a special purpose device or component, a broadcast system, other equipment, or some combination thereof capable of responding to and executing instructions in a defined manner. The search system 130 also may include an input/output (I/O) device (e.g., video and audio input and conversion capability), and peripheral equipment such as a communications card or device (e.g., a modem or a network adapter) for exchanging data with the network 120.

The search system 130 is generally capable of executing instructions under the command of a controller. The search system 130 may be used to provide content to the client 110. The controller may be implemented by a software application loaded on the search system 130 for commanding and directing communications exchanged with the client 110. Other examples of the controller include a program, a piece of code, an instruction, a device, a computer, a computer system, or a combination thereof, for independently or collectively instructing the client 110 or the search system 130 to interact and operate as described. The search system 130 may be embodied permanently or temporarily in any type of machine, component, physical or virtual equipment, storage medium, or propagated signal capable of providing instructions to the client 110 or the search system 130.

Figure 1B:
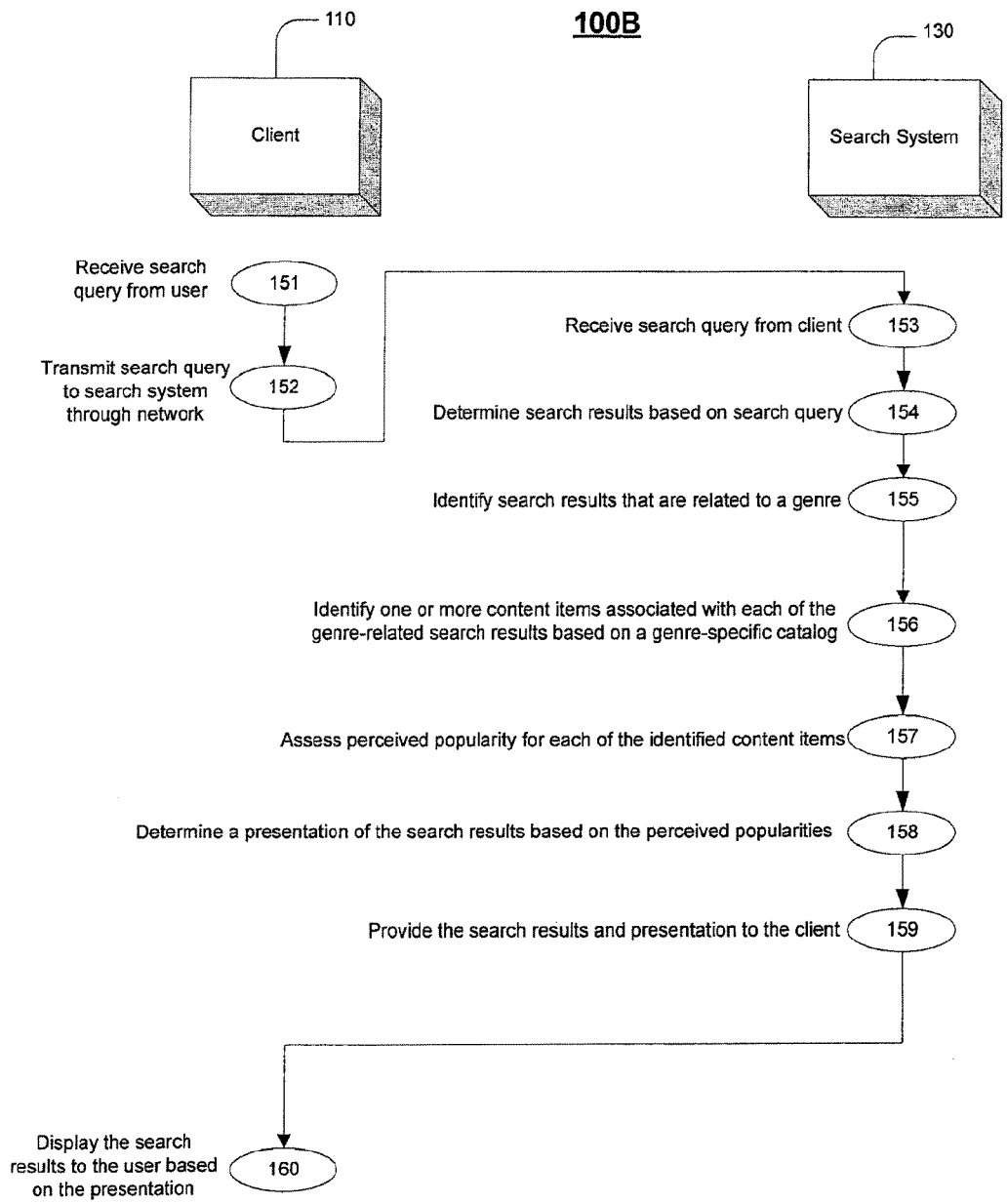
FIG. 1B is a flow chart of an exemplary process for providing search results based on popularity of content items associated with the search results.

Process 100B of FIG. 1B is configured to provide search results based on popularity of content items associated with the search results when a search query is not known to be associated with a specific genre. For convenience, particular components described with respect to FIG. 1A are referenced as performing the process 100B. However, similar methodologies may be applied in other implementations where different components are used to define the structure of the system, or where the functionality is distributed differently among the components shown by FIG. 1A.

The client 110 receives a search query from a user (151) and sends the search query to the search system 130 through the network 120 (152). In the implementation shown in FIG. 1B, the search query is provided by the user in such a way that it is not known to be associated with a particular category or topic, referred to as a "genre." For example, the search query may be inputted into a search engine that is not a genre-specific search engine, or may be inputted into a search engine without the user providing an indication of an associated genre.

The search system 130 receives the search query from the client (153) and determines search results based on the search query (154). The search system 130 identifies search results that are related to a genre (155). The genre may be determined based on information provided by the user in conjunction with the search query, based on a categorization of a search result or a digital instance referred to by the search result, or by some other means. For example, 5 search results may be determined, where 2 of the search results are related to a "music" genre, 2 of the search results are related to a "nature" genre, and 1 of the search results is related to a "sports" genre. The search system 130 may determine that a particular search result is related to a genre by accessing information, such as metadata, associated with a digital instance referred to by the search result. For example, a search result may refer to a web page entitled "I Love Duran Duran" and the web page may be associated with metadata that includes keywords, such as, for example, "music," "rock," and "1980s" included in the web page. The search system 130 may access the keywords included in the metadata and, based on, for example, an ontology or taxonomy, identify a genre to which the keywords belong. In the present example, the keywords "music," "rock," and "1980s" may be determined to belong to a music genre.

In operation 155, the search system 130 identifies search results that are related to a single genre—thus, and for example, search system 130, at this time, identifies the two search results that are related to the "music" genre.

The search system 130 identifies one or more content items associated with each of the genre-related search results based on a genre-specific catalog (156). Content items that may be associated with a search result may be included in a catalog that is specific to the genre related to the search result. The genre of the genre-specific catalog may be the single genre identified for the search results in operation 155 described above. In the present example, the genre identified as being related to the two search results is "music," and thus, the catalog accessed by the search system 130 in order to identify content items associated with each of the genre-related search results is a music-specific catalog.

As described above, a content item may be a real-world person or item, such as, for example, a band, a musical artist, a musical album or a song, and a digital instance may be a digital asset, such as, for example, a digital audio file, a digital video file, or a web page. In the implementation in which content items are music-related (e.g., bands, artists, musical albums and songs), a set of bands, artists, musical albums and songs may be identified during a preliminary search of the Internet and/or by accessing music-related databases. More particularly, the Internet may be searched or crawled to identify a set of music-related content items based on a search for generic music-related words (e.g., song, lyric and music) or music-related words and concepts related to a particular content item (e.g., band names, artist names, album names or song names). The set of music-related content items may be stored in a music-specific catalog.

Additional information related to the content items stored in a genre-specific catalog, such as, for example, perceived popularity for the content items, also may be determined and stored in the genre-specific catalog. As such, a second search of the Internet may be carried out for each identified content item to identify references to the content item. A reference to a content item on the Internet may include information related to the content item described by, or embodied within, a digital instance (e.g., text in a web page that states "Madonna rocks," an audio file that includes the song "Holiday," or an image of the cover art from the album "True Blue"). To determine whether content on a web page or within another type of digital instance (e.g., an image, an audio file, a video file or a document) includes a reference to a music-related content item, the digital instance may be analyzed using a classifier (e.g., a classifier based on a machine learning algorithm, such as, for example, the Support Vector Machine (SVM) algorithm, the Bayes algorithm or the Perceptron algorithm). The classifier may classify web pages or other digital instances as being in a music category (or a broader category, such as, for example entertainment) or being in some other category. The digital instances that are classified as music digital instances, and include content that relates to a music-related content item for which the Internet is being searched, may be used to determine a perceived popularity of the content item, which may be stored in the genre-specific catalog in association with the content item, as described below.

A content item may be identified as being associated with a search result if the digital instance referred to by the search result describes the content item or embodies the content item. To determine if a particular genre-related search result is associated with a content item that is included in the genre-specific catalog, the digital instance (or information related thereto, such as, for example, metadata) to which the particular genre-related search result refers may be accessed and compared with one or more of the content items included in the genre-specific catalog. If the digital instance includes information that is the same as, or sufficiently similar to, information associated with a content item, the digital instance may be deemed to describe or embody the content item. For example, a search result that refers to a web page (i.e., digital instance) that provides lyrics to the song "Big Yellow Taxi" by the band the Counting Crows," may be deemed to be associated with a song (i.e., content item) entitled "Big Yellow Taxi." The search system 130 assesses perceived popularity for the identified content items (157). The genre-specific catalog may include a perceived popularity for each entry associated with a content item. As described above, a perceived popularity may be a parameter (e.g., a single number or other value) that indicates how popular a content item is on the Internet, where the parameter may have a high value if the content item is popular and a low value if the content item is not popular (or vice versa). For each content item determined to be associated with the identified genre-related search results, the search system 130 accesses a perceived popularity stored in the genre-specific catalog. In some implementations, the perceived popularity may be determined by the search system 130 on-the-fly based on the same method (e.g., process 300 of FIG. 3) used to populate the genre-specific database.

The search system 130 determines a presentation of the search results based on the perceived popularity (158). A presentation may, for example, be a visual list of search results, a list of search results that are presented aurally, or a collection of search results presented in a manner other than a list. In some implementations, search results identified as being related to the determined genre (i.e., genre-related search results) may be presented in a way that is visually distinct (e.g., at the top of a search result list, under a heading or grouped together) from search results that are not related to the genre (i.e., genre-neutral search results). Alternatively, all search results may be provided together as a fused group without any indication or separation of genre-related search results versus genre-neutral search results.

In either case, genre-related search results may be further organized based on the perceived popularity for the content items associated with the identified search results. For example, search results associated with content items having perceived popularity indicative of greater popularity may be presented higher in a search result list, at a privileged position (e.g., grouped to the side of the search result list) or with a specialized indicator (e.g., a high popularity star next to each search result) than those search results associated with content items having perceived popularity that are indicative of lesser popularity. Furthermore, genre-neutral search results may be presented, for example, as a group that is visually separated from the genre-related search results. Alternatively, and also for example, non-genre-related search results may be intermixed with genre-related search results, such that the placement of the genre-related search results relative to each other changes based on the perceived popularity, but the position of the genre-related search results remains the same relative to the non-genre-related search results.

The search system 130 provides the search results and presentation to the client through the network 120 (159). The client 110 displays the search results to the user based on the determined presentation (160).

In some implementations, the perceived popularity stored in the genre-specific catalog also may be used by the search system 130, for example, to identify digital instances for automatic placement in a content (e.g., audio or video) inbox or to provide recommended content and targeted advertisements to a user.

In some implementations, the client 110 may request direct access to a genre-specific or a genre-neutral catalog stored in data store 140 from search system 130 through network 120. The direct access may enable the client 110 to use the perceived popularity stored within the catalog for content items to organize digital instances (that describe or embody those content items) within a private database, and provide popularity-based search results when querying the private database.

Figure 1C:
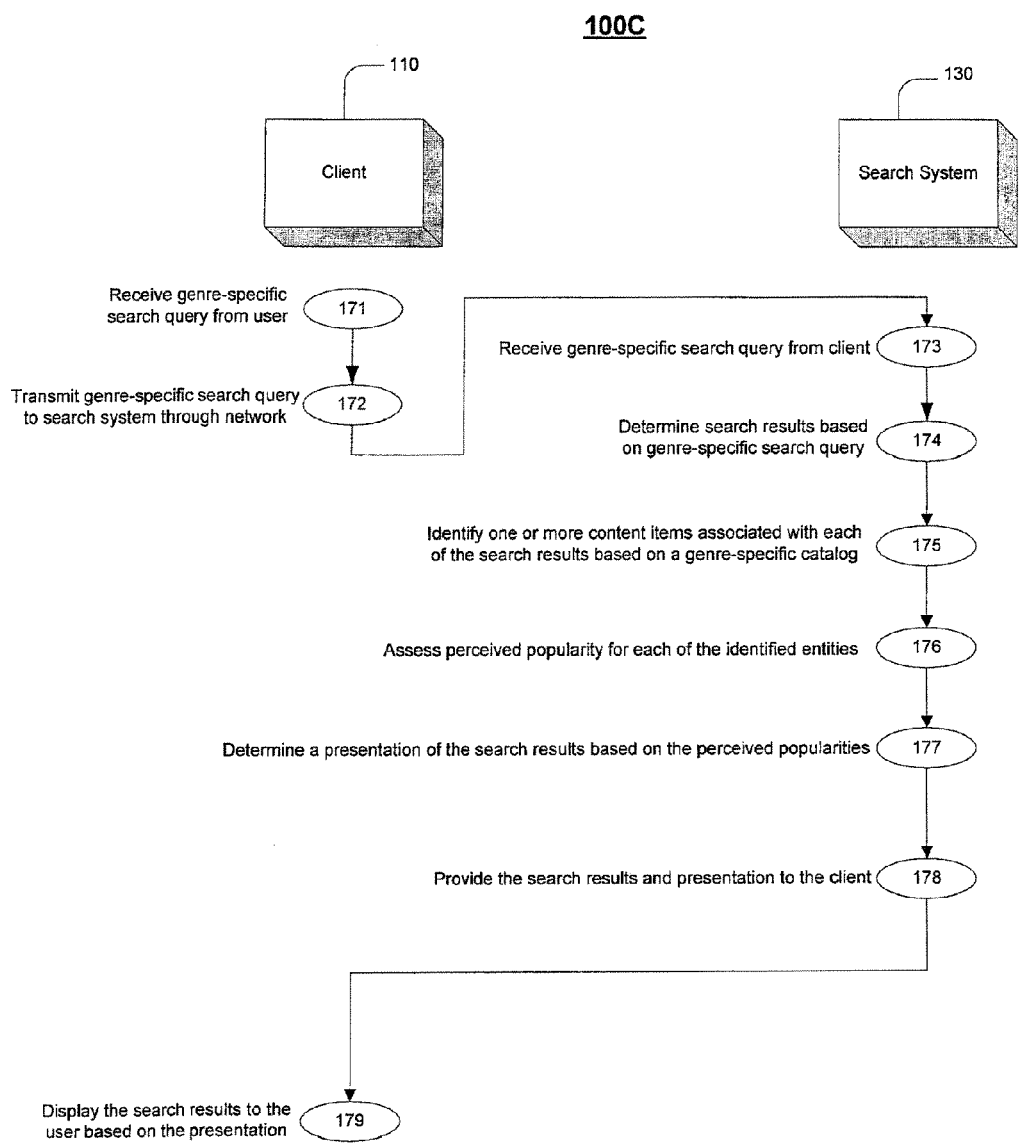
FIG. 1C is a flow chart of an exemplary process for providing search results based on popularity of content items associated with the search results in response to a search query known to be related to a particular genre.

Process 100C of FIG. 1C is configured to provide search results based on popularity of content items associated with search results in response to a search query that is known to be associated with a particular genre. For convenience, particular components described with respect to FIG. 1A are referenced as performing the process 100C. However, similar methodologies may be applied in other implementations where different components are used to define the structure of the system, or where the functionality is distributed differently among the components shown by FIG. 1A.

The client 110 receives a genre-related search query from a user (171) and transmits the search query to the search system through the network 120 (172). The search system 130 may determine that the search query is related to a genre, in some implementations, because the search query was provided by the user into a genre-specific search engine, such as, for example, a music-based search engine. Alternatively, or additionally, the user may provide, or select, a genre to be associated with the search query upon providing the search query to a search engine. For example, the user may select a genre from a pull-down menu or some other user interface element, or the user may supply their own genre via an input box. A search query related to the "music" genre may include lyrics for a song, a full or partial title of a song, a full or partial title of a music album, an artist name or any combination thereof. For example, a search query received by search system 130 may be "paved paradise," which represents a portion of a lyric from the song "Big Yellow Taxi."

The search system receives the genre-related search query from the client (173) and determines search results based on the genre-related search query (174), as described above with respect to process 100B of FIG. 1B. In the implementation of process 100C, the search system 1300 need not necessarily determine one or more genres associated with the search results because the search query is already related to a genre. As such, and presumably, the search results determined based on the genre-related search query already may be associated with a known genre (e.g., the genre of the genre-specific search query).

The search system 130 identifies a content item associated with each of the genre-related search results based on a genre-specific catalog (175). Operation 175 may be performed in the same manner as that described for operation 156 of process 100B, and as further described below with respect to FIG. 2.

The search system 130 assesses perceived popularity for the identified content items (176). In some implementations, the perceived popularity may be stored in, and accessed from, a genre-specific catalog that is related to the genre of the genre-specific search query, or may be determined on-the-fly, as described above with respect to process 100B of FIG. 1B. Alternatively, the perceived popularity may be stored in a genre-neutral catalog for content items, and which includes an indication of a genre associated with at least some of the content items stored in the genre-neutral catalog. For example, a genre-neutral catalog may include two entries for a content item "Eagles," where one entry includes an indication of a "music" genre and the other includes an indication of a "sports" genre, and each entry is associated with its own perceived popularity.

The search system 130 determines a presentation of the search results based on the perceived popularity (177) and provides the search results and presentation to the client 110 (178). The client 110 displays the search results to the user based on the presentation (179).

In some implementations, search results determined during processes 100B or 100C may not be identified as being related to a particular genre. As such, a genre-specific catalog may not be accessed by the search system 130 to identify content items associated with each of the determined search results. Instead, the search system 130 may access a genre-neutral catalog, which may include a listing of content items related to multiple genres (and, in some cases, an indication of genres to which the stored content items are related), as well as perceived popularity related to each of the stored content items. Each search result determined based on the search query may be compared against the genre-neutral catalog to identify a content item that is associated with the search results, as described in more detail with respect to FIG. 2.

Figure 2:
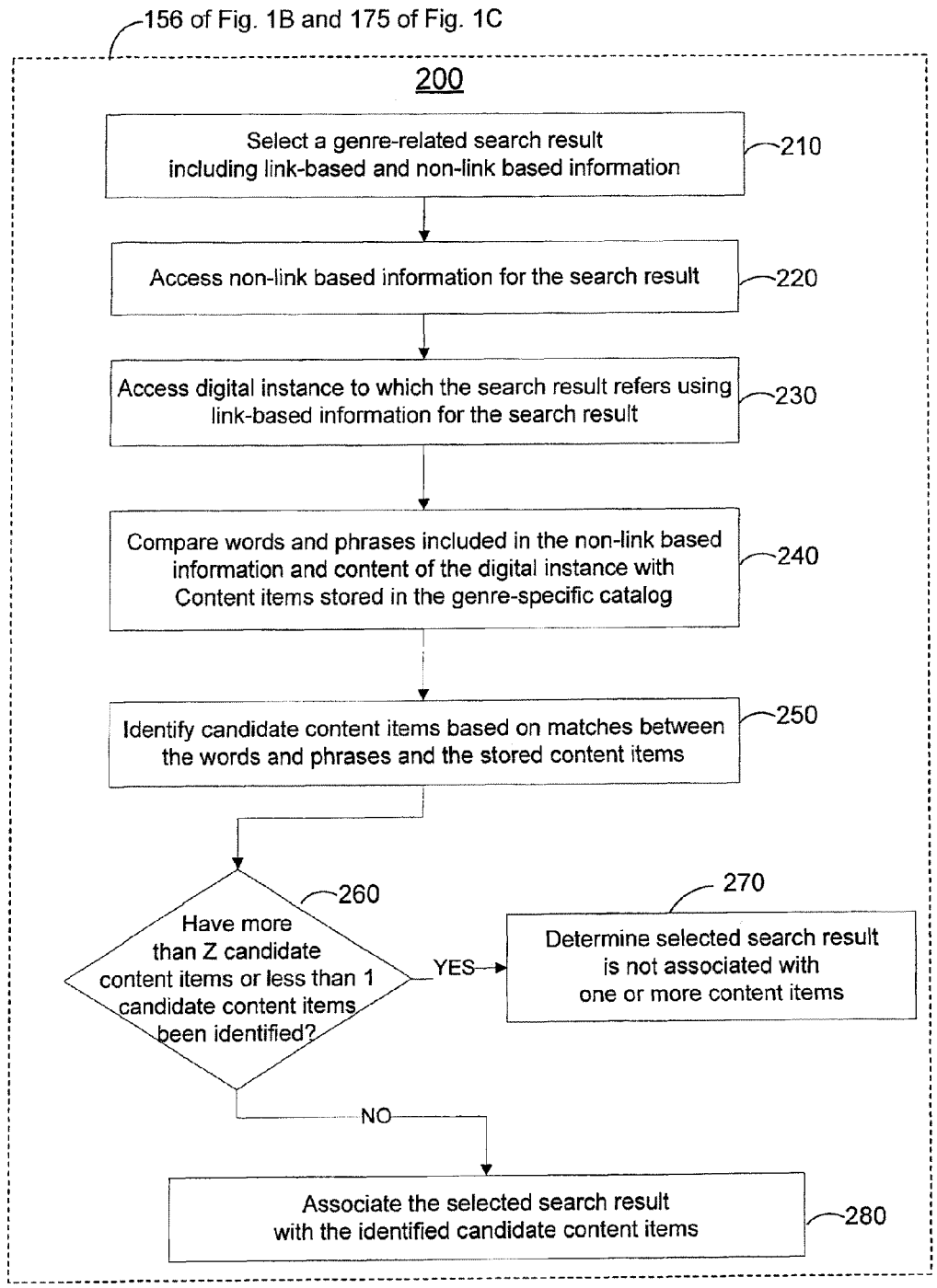
FIG. 2 is a flow chart of an exemplary process for identifying a content item associated with a search result.

Process 200 of FIG. 2 is configured to identify a content item associated with a search result. For convenience, particular components described with respect to FIG. 1A are referenced as performing the process 200. However, similar methodologies may be applied in other implementations where different components are used to define the structure of the system, or where the functionality is distributed differently among the components shown by FIG. 1A. Process 200 is one exemplary implementation of operation 156 of FIG. 1B and operation 176 of FIG. 1C.

The search system 130 selects a genre-related search result (210). The search results were determined, and identified as being related to a particular genre, during at least one of processes 100B and 100C. For example, the search system 130 selects a search result that refers to a Madonna Blog web page (i.e., digital instance) that discusses the singer Madonna.

A search result includes a link (i.e., hyperlink) or pointer that is selectable by a user to access a digital instance that is referred to by the search result. A search result also includes non-link based information that describes the digital instance to which the search result refers. For example, the Madonna search result includes a link to the Madonna Blog web page (i.e., www.madonnablog.com) and non-link based information about the web page (i.e., web page title "Stephanie's Madonna Blog" and the first sentence displayed on the web page "Welcome to my Madonna blog!").

The search system 130 accesses non-link based information for the search result (220). In the present example, the search system 130 accesses the non-link based information for the Madonna search result, which includes the web page title "Stephanie's Madonna Blog" and the first sentence of the web page "Welcome to my Madonna blog!"

The search system 130 accesses the digital instance to which the search result refers using link-based information for the search result (230). In the present example, the search system 130 accesses the Madonna Blog web page by following the link-based information for the search result (e.g., by following the link www.madonnablog.com).

The search system 130 compares words and phrases included in the non-link based information and content of the digital instance with content items stored in the genre-specific catalog (240). For example, the genre-specific catalog includes the content items "Madonna," "Prince," and "U2." The search system 130 compares these content items (and any information associated therewith in the genre-specific catalog, such as, for example, other keywords that are associated with the content items) with words and phrases gleaned from the non-link based information for the search result and content of the Madonna Blog web page.

The search system 130 identifies candidate content items based on matches between the words and phrases and the stored content items (250). For example, the words and phrases in the non-link based information for, and content within, the Madonna Blog web page include the word "Madonna," which is a match for the content item "Madonna." As such, the content item "Madonna" is identified as a candidate content item. In some instances where the words and phrases are a match for more than one content item (e.g., a web page related to a Prince vs. Madonna party may include words and phrases that are a match for both the content item "Madonna" and the content item "Prince"), more than one candidate content item may be identified.

The search system 130 determines if more than Z candidate content items have been identified or less than 1 candidate content item has been identified (260). The number Z may be a predetermined or user-defined threshold number of content items. If more than the threshold number of content items have been identified as candidate content items, it may not be possible for the search system to accurately determine that a particular search result is truly associated with a useful number of content items. For example, a web page that includes an article about musicians from the 1980s may include words and phrases that are a match for 25 content items stored in the genre-specific catalog. As such, although the web page is associated with a large number of content items, the web page may not include enough detailed information about a useful number of those content items to be deemed to be associated with any one particular content item. Similarly, if less than 1 candidate content item (i.e., zero candidate content items) has been identified, the selected search result cannot be said to be associated with a particular content item.

As such, if less than 1, or more than Z, candidate content items have been identified, the search system 130 determines that the selected search result is not associated with one or more content items (270).

If more than 1, or less than Z, candidate content items have been identified, the search system 130 associates the selected search result with the identified candidate content items (280). If the number of candidate content items falls between 1 and the threshold number Z, the search system 130 may determine that the selected search result is associated with a useful number of content items, and may so associate those content items with the selected search result.

Figure 3:
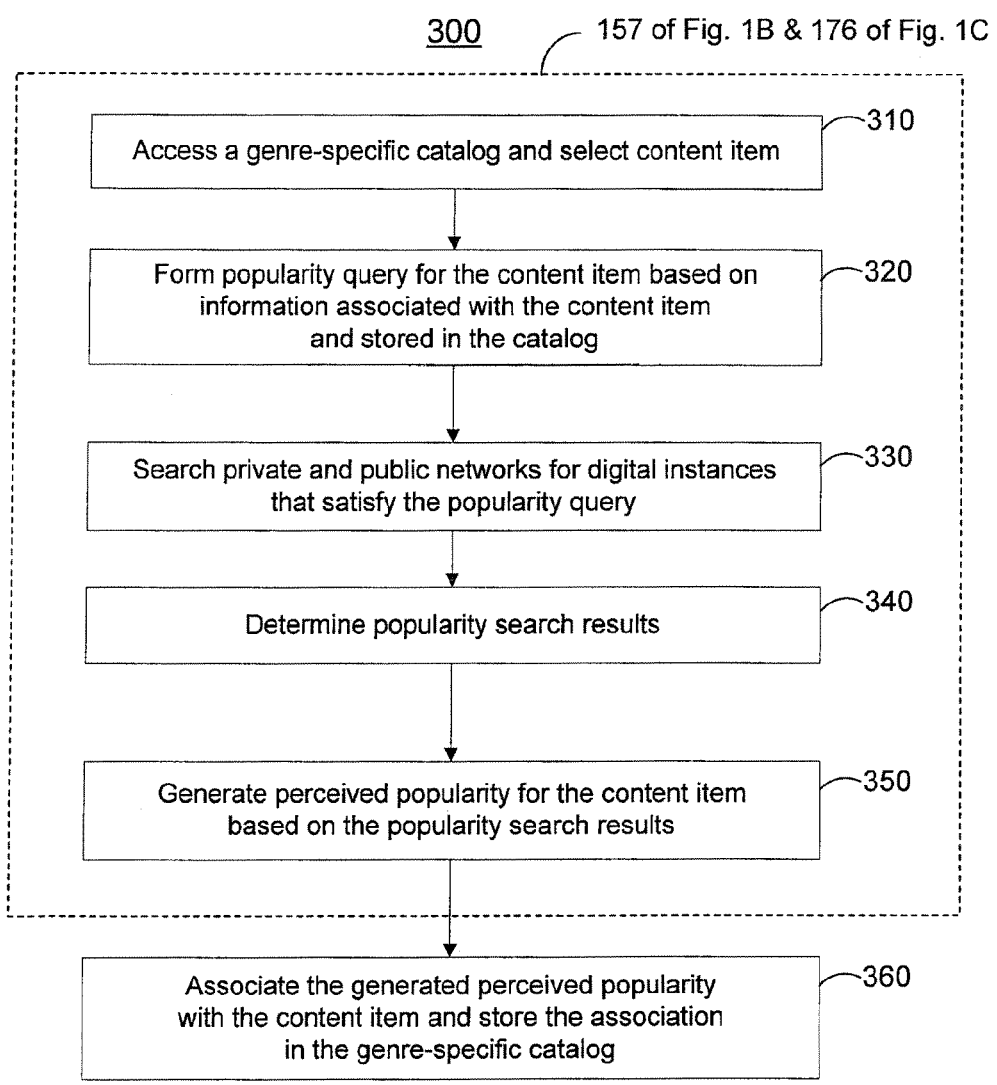
FIG. 3 is a flow chart of an exemplary process for associating a generated perceived popularity for a content item with the content item and storing the association.

Process 300 of FIG. 3 is configured to generate a perceived popularity for a content item and store the association between the perceived popularity and the content item in the genre-specific catalog. For convenience, particular components described with respect to FIG. 1A are referenced as performing the process 300. However, similar methodologies may be applied in other implementations where different components are used to define the structure of the system, or where the functionality is distributed differently among the components shown by FIG. 1A.

The search system 130 accesses a genre-specific catalog and selects a content item, from among content items stored within the genre-specific catalog, to determine if the content item is popular (310). The genre-specific catalog may include content items related to a particular category, such as, for example, music, sports, news, movies or television. The content items that may be included in a music-related catalog, for example, may be artists and related songs, music videos and albums. The search system 130 may select a content item in operation 310 if, for example, the content item does not have a perceived popularity associated therewith or a perceived popularity associated with the content item is stale (e.g., the perceived popularity has not been updated for longer than a threshold amount of time).

The search system 130 forms a popularity query for the selected content item based on information associated with the content item and stored in the catalog (320). For example, the song "Holiday" (i.e., a content item) may be selected, and the popularity query for the song may include the title of the song (e.g., "Holiday") as well as other information associated with the song (e.g., artist "Green Day" and album "American Idiot"). Thus, in the present example, the popularity query may be "Holiday AND Green Day AND American Idiot" or some combination, or sub-combination thereof.

In another implementation, the search system 130 forms a popularity query for the selected content item based on information stored in other data sources, in addition to, or instead of, the genre-specific catalog. For example, the search system 130 may form a popularity query for the song "Holiday" based on information found in a music web page (e.g., CDNow.com) about songs having the title "Holiday."

The popularity query for a content item may be used by the search system 130 to determine if information related to the content item is being referenced on the Internet, and thus, whether, and to what extent, the content item is popular. To do so, the search system 130 searches private (e.g., a hard drive of a personal computer) and public (e.g., the Internet) networks for digital instances that satisfy the popularity query (330). For example, the search system 130 may review web pages on the Internet seeking information that is related to the popularity query, much like a search engine may traverse the Internet seeking information that satisfies a search query. For example, search system 130 may detect a web page that is entitled "Green Day Rocks" and which refers to both the song "Holiday" and the album "American Idiot."

The search system 130 determines popularity search results based on the digital instances identified as satisfying the popularity query (340). More particularly, the search system 130 may generate search results that refer to digital instances that describe or embody the selected content item (e.g., the "Green Day Rocks" web page). The search results may be used by the search system 130 to determine the popularity of the content item.

The search system 130 generates a perceived popularity for the content item based on the popularity search results (350). For example, the more popularity search results that are determined, the more popular the content item may be, as described in more detail below.

The generated perceived popularity may be associated with the selected content item and stored within the genre-specific catalog (360) in association with the content item in, for example, a perceived popularity field. For example, an entry within the genre-specific catalog may include the song "Holiday" and a number that represents a perceived popularity associated with the song. The search system 130 may refer to the perceived popularity field of the genre-specific catalog whenever search results that are related to the genre are to be presented to a user.

In some implementations, the popularity field of the genre-specific catalog may be referenced by a device or system outside search system 130. For example, a user may maintain a private database of digital instances related to a particular genre (e.g., music), which describe or embody particular content items. The user may wish to sort or search the private database based on popularity of the content items which are described by or embodied in the digital instances. As such, the user's local device (e.g., personal computer) may contact the search system 130 through network 120 and request access to the genre-specific catalog as stored in data store 140. The local device then may determine if a perceived popularity exists for content items that are the same as, or similar to, content items described by or embodied in digital instances stored in the private database. If so, the local device may identify the perceived popularity and associate them with content items (via the digital instances) in the private database.

In some implementations, the popularity field of the genre-specific catalog may be referenced by search system 130 for providing information other than search results. For example, search system 130 may provide information to a user in a content (e.g., video or audio) inbox. Upon entering the inbox, the user may be presented with "hot" digital instances. The "hot" digital instances may be determined, and presented to the user, based on perceived popularity stored in the catalog, and associated with the "hot" digital instances describing or embodying popular content items. In another example, the same perceived popularity can be used to identify, for example, information recommendations and advertisements for a user.

Figure 4:
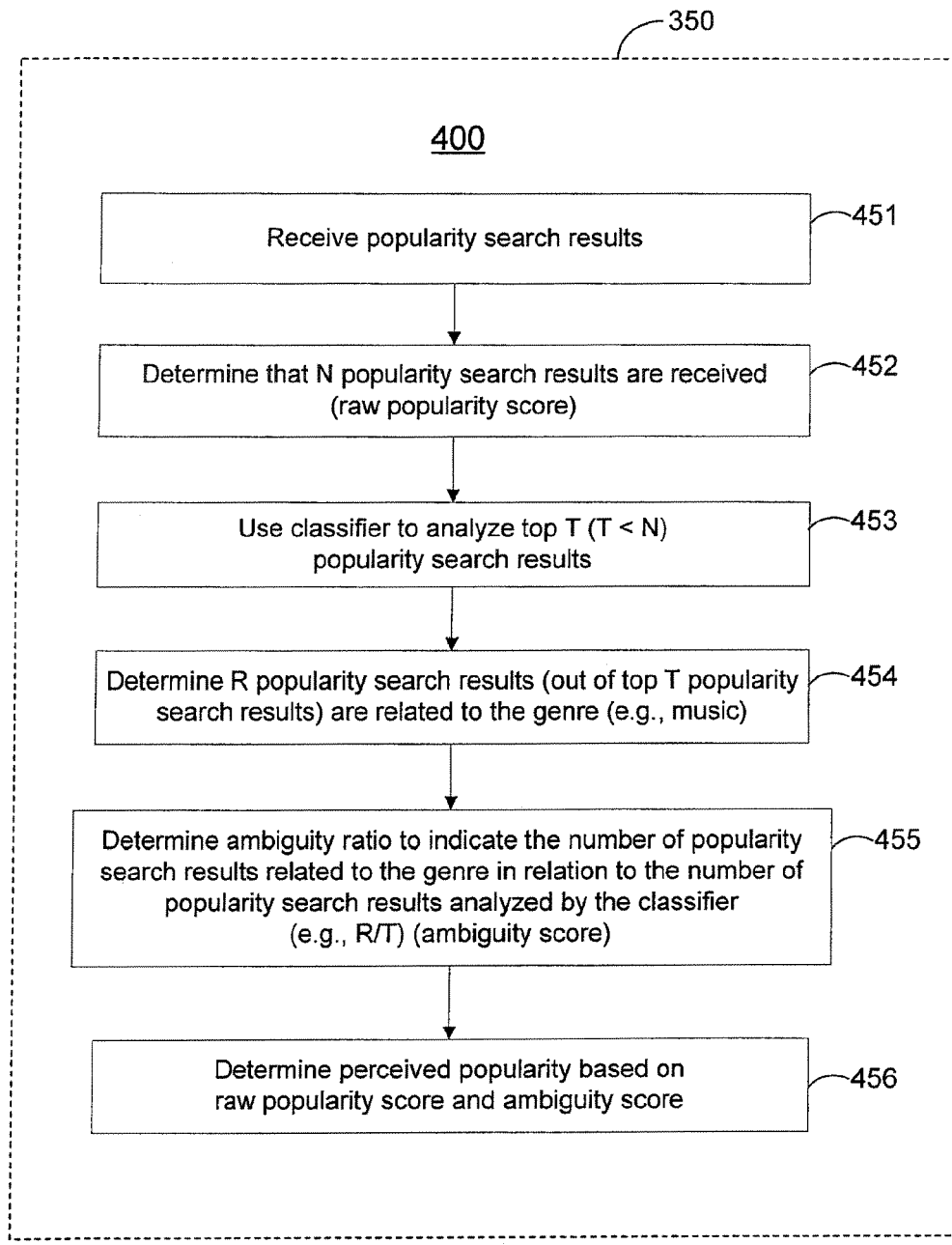
FIG. 4 is a flow chart of an exemplary process for generating a perceived popularity for a content item.

Process 400 of FIG. 4 is configured to generate a perceived popularity for a content item. For convenience, particular components described with respect to FIG. 1A are referenced as performing the process 100B. However, similar methodologies may be applied in other implementations where different components are used to define the structure of the system, or where the functionality is distributed differently among the components shown by FIG. 1A. Process 400 is an illustration of one implementation of operation 350 of FIG. 3.

The search system 130 receives popularity search results for a particular content item, as determined in process 300 of FIG. 3 (410). The popularity search results may include search results determined by the search system 130 based on the popularity query formed during process 300 of FIG. 3.

The search system 130 determines that N popularity search results are received, where N is referred to as the raw popularity score (420). The search system 130 may simply count the number of popularity search results retrieved in response to the popularity query, or the search system 130 may increase a counter each time a popularity search results is determined. Thus, upon completion of the determination of all responsive popularity search results, the search system 130 may determine that the list of responsive popularity search results includes N popularity search results. For example, if 20 popularity search results are received, N=20.

The search system 130 uses a classifier to analyze the top T popularity search results from among the N popularity search results, where T is less than N (430). A popularity search result may be among the top T popularity search results if the search result is associated with a greater perceived popularity than a predetermined number of other search results. The number T may be predetermined or set by a user.

In general, a classifier is a decision system that is provided with values of some features or characteristics of a situation as input and produces as an output a discrete label related to the input values. A classifier may be a machine learning classifier in that the classifier automatically builds upon the initial input values based on data encountered by the classifier, and, in some situations, feedback provided by a user, in order to provide more accurate results (e.g., labeling) in the future.

The classifier used by search system 130 may be seeded with information related to the content item selected. For example, if the content item selected is a song, the classifier may include information related to songs in order for the classifier to determine if any of the top T popularity search results are related to music, in general, and songs, in particular. The classifier may include song-related information, such as, for example, song titles, artist names, album titles, file extensions associated with music (e.g., .mp3 or .wav) and other music-related words (e.g., "band," "track," "CD" and "concert").

The classifier determines R popularity search results (from among the top T popularity search results) that are related to the genre of the genre-specific catalog (e.g., music) from which the content item (e.g., song) was selected (440). For example, the top T popularity search results for a song entitled "Breathe" may include search results related to the song "Breathe" by artist Faith Hill, the song "Breathe" by artist "Blu Cantrell" and articles related to new products for helping people "breathe" better at night. Thus, the classifier may include the popularity search results for the two songs entitled "Breathe" within the R popularity search results, while the article related to better breathing may not be included.

The classifier determines an ambiguity ratio to indicate a number of popularity search results that are related to the genre in relation to the number of popularity search results that are analyzed by the classifier (450). For example, the ratio may be the R popularity search results related to the music genre over the T top search results that were analyzed to determine search results within the music genre (i.e., R/T). The ratio may be referred to as an ambiguity score. Additionally, or alternatively, the classifier may determine a number of popularity search results N and a number of popularity search results R (from the entire group of N popularity search results) that are within the genre from which the content item was selected. In this implementation, the ambiguity score may be determined by calculating the logarithm of the ratio N/R (i.e., log (N/R)).

The search system 130 determines a perceived popularity for a content item based on the raw popularity score and the ambiguity score (460). For example, the perceived popularity (e.g., a single popularity score) may be determined by performing an operation (e.g., addition, subtraction, multiplication or division) on the raw popularity score and the ambiguity score. For example, the following formula may be used.

$$BP(e)=N(e)+AR(e)$$

where BP(e) is the perceived popularity for a content item e, N(e) is the raw popularity score for the content item e and AR(e) is the ambiguity ratio for the content item e.

Figure 5:
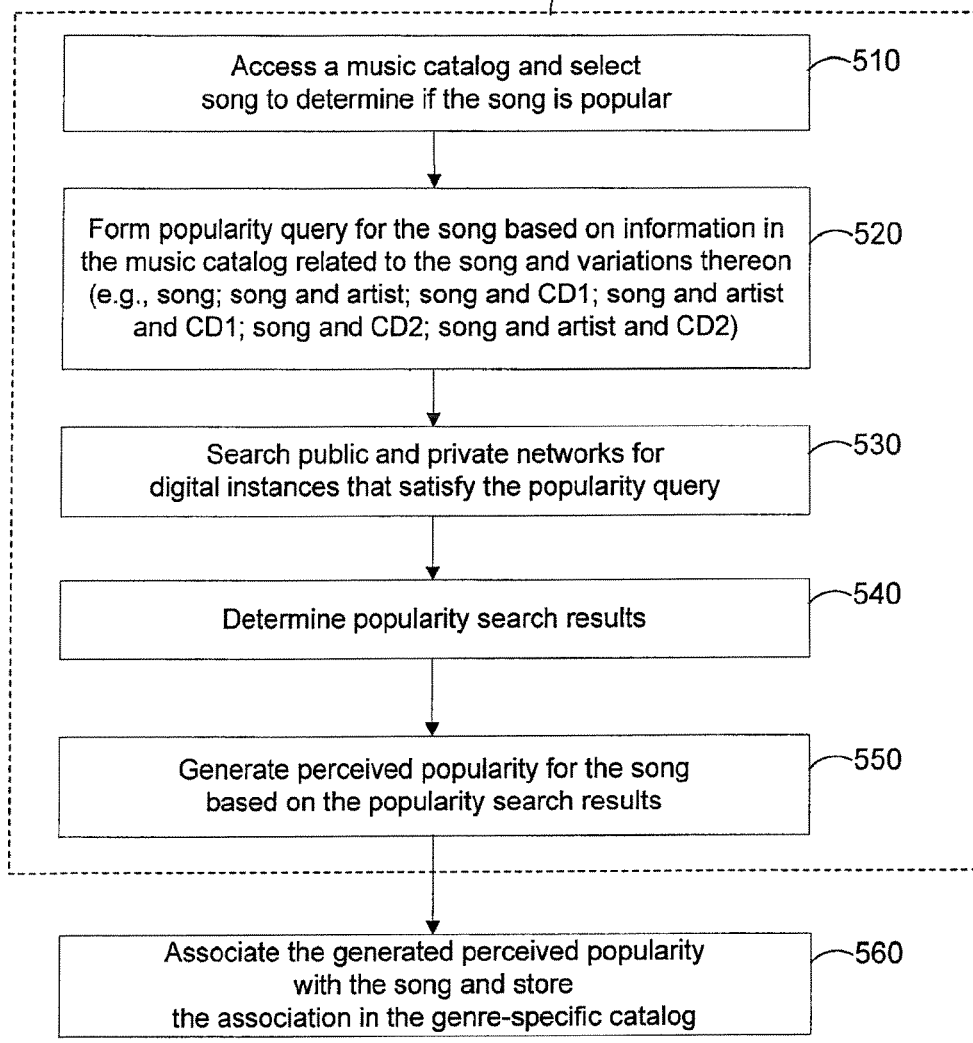
FIG. 5 is a flow chart of an exemplary process for generating a perceived popularity for a song, associating the perceived popularity with the song, and storing the association in a genre-specific catalog.

Process 500 of FIG. 5 is configured to determine a perceived popularity for a song, associating the perceived popularity with the song, and storing the association in a genre-specific catalog. For convenience, particular components described with respect to FIG. 1A are referenced as performing the process 500. However, similar methodologies may be applied in other implementations where different components are used to define the structure of the system, or where the functionality is distributed differently among the components shown by FIG. 1A.

The search system 130 accesses a music-specific catalog and selects a song to determine if the song is popular (510). The content item selected from the music-specific catalog can also be an artist, a music video or an album. For example, the search system 130 may select a song entitled "Big Yellow Taxi."

The search system 130 forms a popularity query for the song based on various combinations of tetins related to information in the music-specific catalog related to the song (520). For example, the popularity query may be "song," "song and artist," "song and CD1, "song and artist and CD1," "song and CD2" and "song and artist and CD2, " where CD1 is a first album on which the song appears and CD2 is a second album on which the song appears, such as, for example, a soundtrack or greatest hits album. In the present example, the popularity query for "Big Yellow Taxi" may be "song and artist"—"Big Yellow Taxi AND Counting Crows."

The search system 130 searches both public (e.g., the Internet) and private (e.g., locally-stored) networks for content that satisfies the popularity query (530) and determines popularity search results based on the content (540). The popularity search results may refer to documents (e.g., web pages, text documents, audio, video and images) that include content that satisfies the popularity query. For example, a popularity search result for the popularity query "Big Yellow Taxi AND Counting Crows" may refer to a web page entitled "Lyrics for Big Yellow Taxi by Counting Crows."

The search system 130 determines a perceived popularity for the song based on the popularity search results (550), as described above. The perceived popularity may be associated with the selected content item and stored within the genre-specific catalog (560). For example, a particular perceived popularity may be stored in the genre-specific catalog in association with an entry for the song "Big Yellow Taxi."

Figure 6:
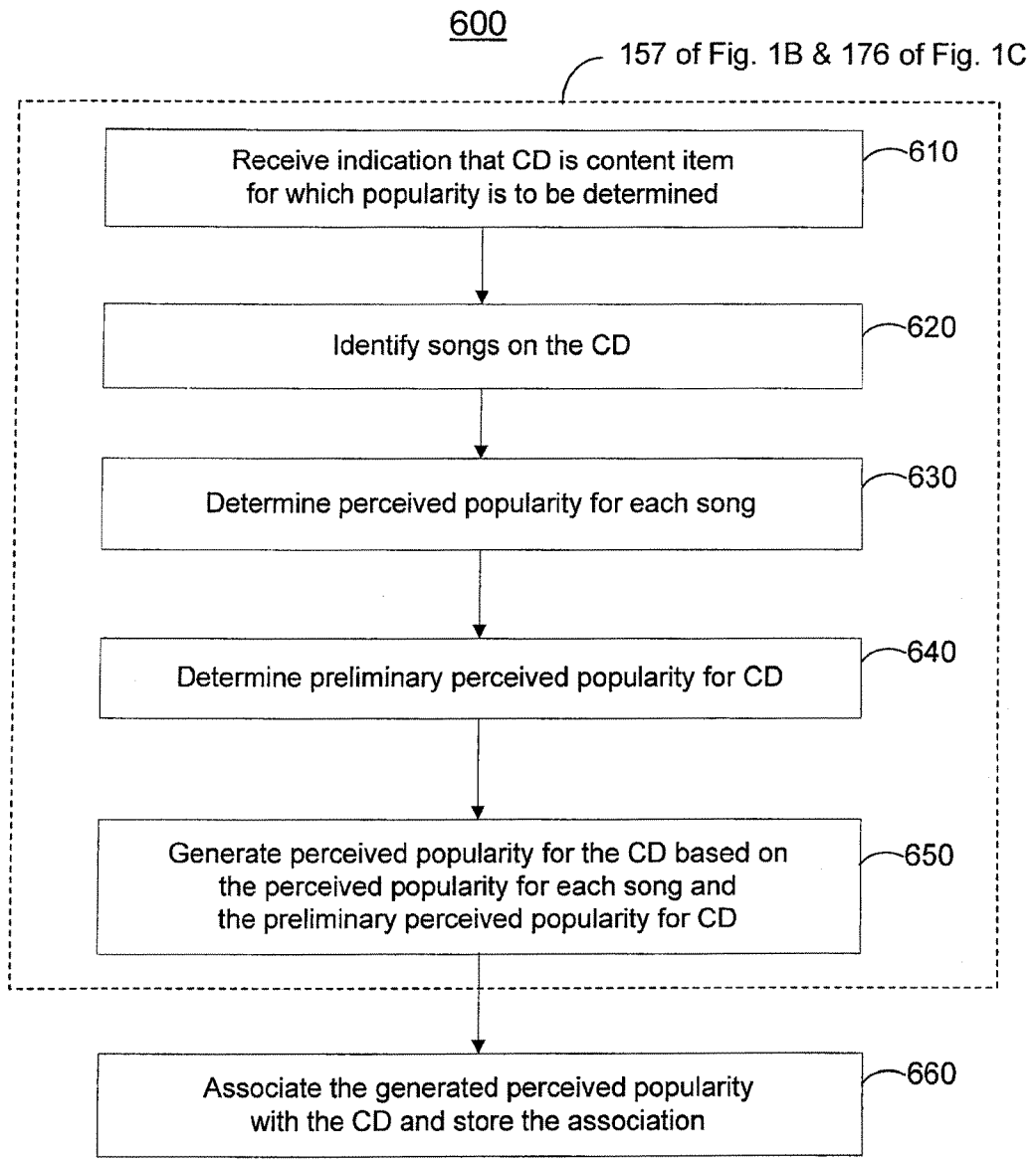
FIG. 6 is a flow chart of an exemplary process for generating a perceived popularity for a music album associating the perceived popularity with the music album, and storing the association in a genre-specific catalog.

Process 600 of FIG. 6 is configured to determine a perceived popularity for a music album associating the perceived popularity with the music album, and storing the association in a genre-specific catalog. For convenience, particular components described with respect to FIG. 1A are referenced as performing the process 600. However, similar methodologies may be applied in other implementations where different components are used to define the structure of the system, or where the functionality is distributed differently among the components shown by FIG. 1A.

In general, the popularity of an album (e.g., a compact disc (CD)) may be determined based on a combination of the popularity of the album by itself and the popularity of individual songs on the album. To determine the popularity of a CD, the search system 130 receives an indication that a CD is the selected content item for which popularity is to be determined (610). For example, upon selection of the content item from the catalog by the search system 130, the search system 130 may detect a tag or other indicia associated with the content item, which indicates that the selected content item is a CD, rather than a song or artist.

The search system 130 identifies songs that are on the CD (620). In some implementations, an indication of the songs on the CD may be associated with the CD content item within the genre-specific catalog. For example, the CD "Breathe" by artist Faith Hill may include, inter alia, the songs "What's In It For Me?," "I Got My Baby," and "Breathe." Additionally, or alternatively, search system 130 may refer to another source (e.g., a music-related database, such as, for example, Muse, FreeDB or AMG) to identify songs that are on a particular CD.

The search system 130 determines a perceived popularity for each song on the CD 630), using, for example, process 500 of FIG. 5. The search system 130 determines a preliminary perceived popularity for the CD, which includes only the popularity of the CD on its own (i.e., without the influence of popularity of any particular song on the CD) (640).

The search system 130 determines a perceived popularity for the CD based on the perceived popularity for each song and the preliminary perceived popularity for the CD (650). In some implementations, to combine a perceived popularity for songs on a CD with a preliminary perceived popularity of the CD, itself, a mathematical operation (e.g., addition, subtraction, multiplication, division or averaging) may be performed on the perceived popularity.

Figure 7:
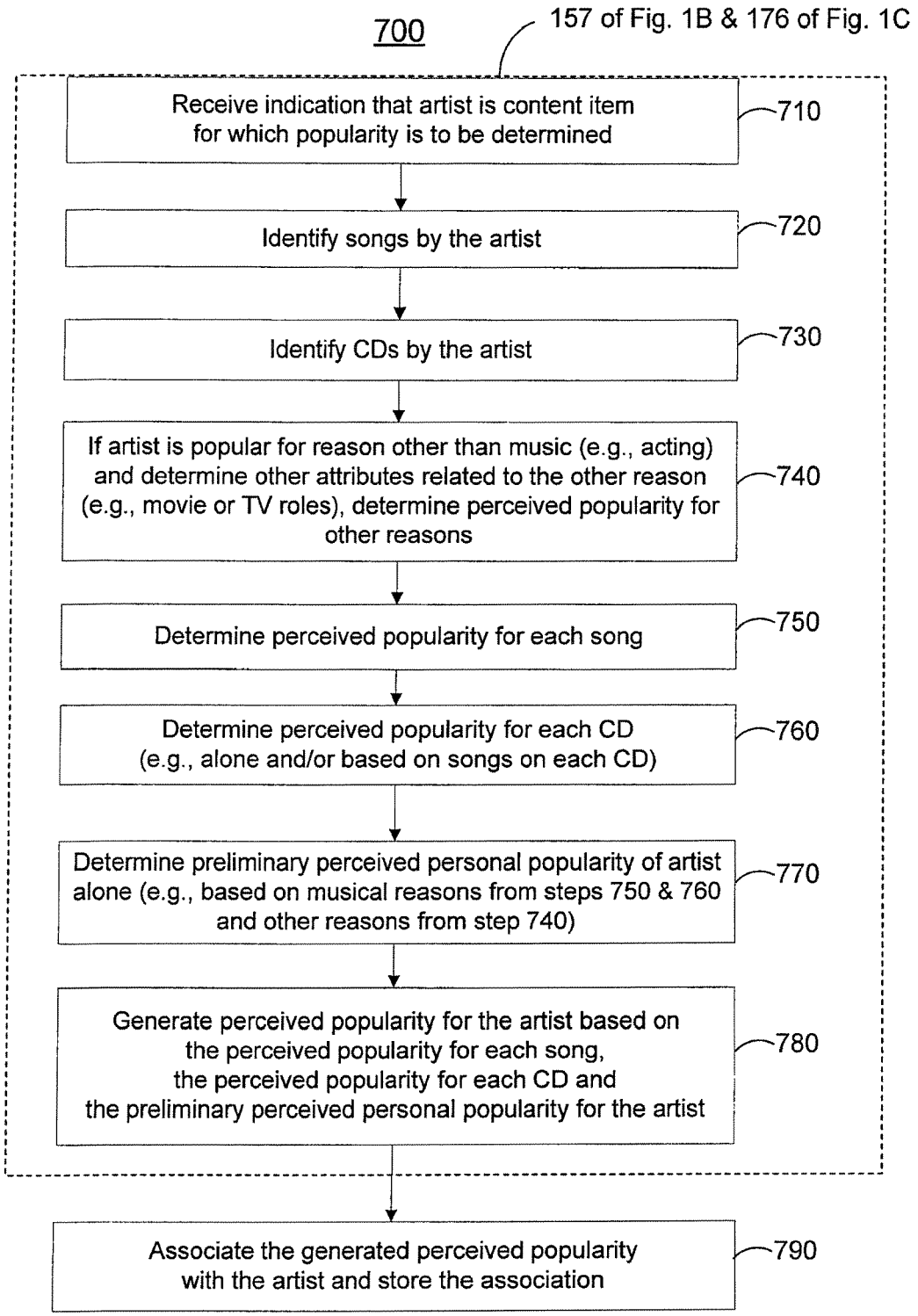
FIG. 7 is a flow chart of an exemplary process for generating a perceived popularity for a music artist, associating the perceived popularity with the music artist, and storing the association in a genre-specific catalog.

Process 700 of FIG. 7 is configured to determine a perceived popularity for a music artist, associating the perceived popularity with the music artist, and storing the association in a genre-specific catalog. For convenience, particular components described with respect to FIG. 1A are referenced as performing the process 700. However, similar methodologies may be applied in other implementations where different components are used to define the structure of the system, or where the functionality is distributed differently among the components shown by FIG. 1A.

Similar to that described above, in general, the popularity of an artist may be determined based on a combination of the popularity of songs and CDs produced by the artist, as well as personal popularity of the artist related to appearances by the artist in television commercials, television shows or movies, activism performed by the artist or any celebrity gossip related the artist.

To determine the popularity of an artist, the search system 130 receives an indication that an artist is the selected content item for which popularity is to be determined, similar to the determination made in operation 610 of FIG. 6 (710). The search system 130 identifies songs by the artist (720) and CDs by the artist, similar to the identification made in operation 620 of FIG. 6 (730).

The search system 130 determines if the artist is popular for reasons other than their music career (e.g., acting) and determines other attributes that are related to the other reason (e.g., movie or television roles) (740). For example, the music-related catalog may include information related to personal popularity for an artist, and the search system 130 may, in one implementation, request this information from the catalog along with, or subsequent to, selection of the artist from the catalog. In some implementations, the search system 130 may access other sources, such as, for example, other artist and celebrity information databases and web pages (e.g., E Online! web page or Entertainment Tonight web page) to identify information related to personal popularity for a particular artist.

The search system 130 determines a perceived popularity for each song by the artist (750), using, for example, process 500 of FIG. 5, and each CD by the artist, using, for example, process 600 of FIG. 6 (760).

The search system 130 also determines a perceived personal popularity for the artist based on musical reasons (e.g., a Grammy win) and other reasons (e.g., having a baby or being in the summer blockbuster movie) (770).

The search system 130 determines a perceived popularity for the artist based on the perceived popularity for each song and each CD and the perceived personal popularity for the artist (780). In some implementations, to combine a perceived popularity for songs on a CD, various CDs and a perceived personal popularity for an artist, a mathematical operation (e.g., addition, subtraction, multiplication, division or averaging) may be performed on the perceived popularity.

Data file 800 of FIG. 8 is included in data store 140. More particularly, data file 800 is an illustration of a music-specific catalog 800. For illustrative purposes, music-specific catalog 800 shows content items that are songs, where each entry in the music-specific catalog 800 includes a song and information related to the song. Additionally, music-specific catalog 800 may include separate entries for content items related to albums, artists, music videos and other music-related content items, and the information in various entries may overlap. For example, a song entry may include a particular CD on which the song has been included, while an entry for the particular CD may include the song.

The music-specific catalog 800 includes a list of song titles 811, such as, for example, songs having the word "Breathe" in the title, songs entitled "Big Yellow Taxi" and songs entitled "Holiday." For each song title, an artist 812 who sings a song having that title is listed, as well as a first 813 and second 814 (if applicable) album (e.g., CD) on which the song appears.

The music-specific catalog 800 also includes a perceived popularity for each content item (e.g., song) within the music-specific catalog 800. The perceived popularity is a parameter that may, in some implementations, include a single number that represents a combination of a raw popularity score and an ambiguity ratio, as described above. The entries for some content items within music-specific catalog 800 do not include a perceived popularity because, for example, no perceived popularity has been determined for the song or a perceived popularity determined for the song has become stale, and thus, was removed. Content items without a perceived popularity may be selected by search system 130, as described above, for determination of a perceived popularity associated therewith. For example, in an exemplary entry 820, the artist Blu Cantrell sings a song titled "Breathe," which appears on the album "Bittersweet" and has a perceived popularity of "40."

As described above, the music-specific catalog may be used to determine popularity of a particular song, album, artist or other music-related digital instance. When providing search results for a search query associated with a content item, the search system 130 may visually present search results that are associated with popular songs, albums or artists in a manner that separates search results that are most likely to be responsive to the search query from other run of the mill search results. Thus, the provided search results may more accurately, or easily, satisfy an information need of the user who entered the search query.

Figure 9:
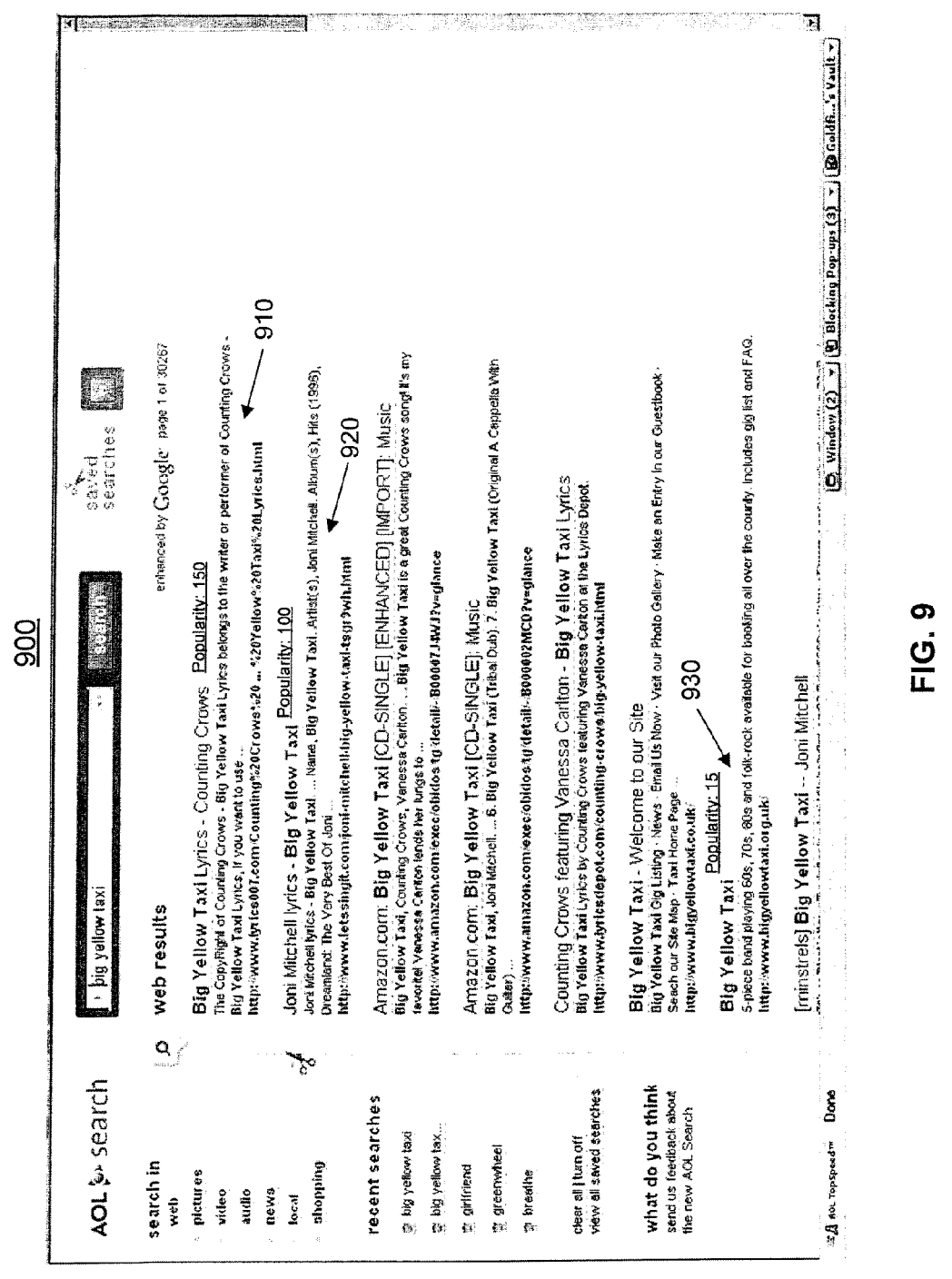

GUI 900 of FIG. 9 is structured and arranged to provide search results for a search query based on popularity of songs associated with the search results. Perceived popularity for songs associated with the search results may be determined using, for example, process 500 of FIG. 5, and may be accessed from a genre-specific catalog, such as, for example, music-specific catalog 800 of FIG. 8. More particularly, GUI 900 provides search results for songs that include the phrase "Big Yellow Taxi" as a lyric, a title, an album name, or an artist name.

A search result 910 associated with the Counting Crows version of the song "Big Yellow Taxi" is provided at the top of the search result list because the popularity of the Counting Crows version of the song (e.g., 150 as shown) may be greater than that of other artists (e.g., Amy Grant, Joni Mitchell and Pinhead Gunpowder) who have performed and/or recorded the tune, as determined based on a perceived popularity for content items associated with each of the search results accessed within a music-specific catalog.

Although search results associated with Counting Crows may be provided at the top of the search result list (i.e., the Counting Crows search results may be "boosted" to the top of the list), search results associated with other songs having the phrase "Big Yellow Taxi" as a title also may be provided as search results, but at a lower ranked position. For example, a search result 920 associated with to the Joni Mitchell version of the song is the second search result listed, and thus, may be associated with a perceived popularity (e.g., 100 as shown) that is close to the perceived popularity for the Counting Crows tune (e.g., 150 as shown in FIG. 8). As such, the search system 130 may have determined that although the Counting Crows tune is more popular than the Joni Mitchell version, the popularity ranking among the two is very close. Furthermore, a web page for a band called "Big Yellow Taxi" also appears as a search result 830, though much lower in the search result list, indicating a lesser popularity (e.g., 15 as shown) and lesser likelihood that the search result 930 is the most responsive search result for the search query.

As described above, a particular search result may be associated with more than one content item. For example, a search result that refers to a "Madonna vs. Prince" web page may be determined to be associated with both the artist Madonna and the artist Prince. Because each of the artists may be associated with its own perceived popularity, this particular search result may be deemed to be associated with two perceived popularity. To determine where to present such a search result in a list of search results, a single perceived popularity may be determined for the search result. In a first implementation, the search system 130 may combine the perceived popularity for the more than one content item to which the search result refers by, for example, averaging the two perceived popularity or performing some other mathematical operation on the two perceived popularity (e.g., addition, subtraction, multiplication, or division). In a second implementation, the search system 130 may determine a content item that is more closely related to a search query that resulted in presentation of the search result and use the perceived popularity associated with the determined content item as the perceived popularity for the search result. In a third implementation, the search system 130 may assign the perceived popularity associated with one of the content items as the perceived popularity for the search result, such as, for example, the search system 130 may determine that a search result is only as popular as its least popular content item, and, as such, use the lowest perceived popularity as the perceived popularity for the search result. In a fourth implementation, the search system 130 may present the search result more than once in a search result list based on each of the perceived popularity associated with the more than one content items referred to by the search result. The first, second, third, and fourth implementations, or a sub-set thereof, may be used by the search system 130 in combination or independently.

Figure 10:
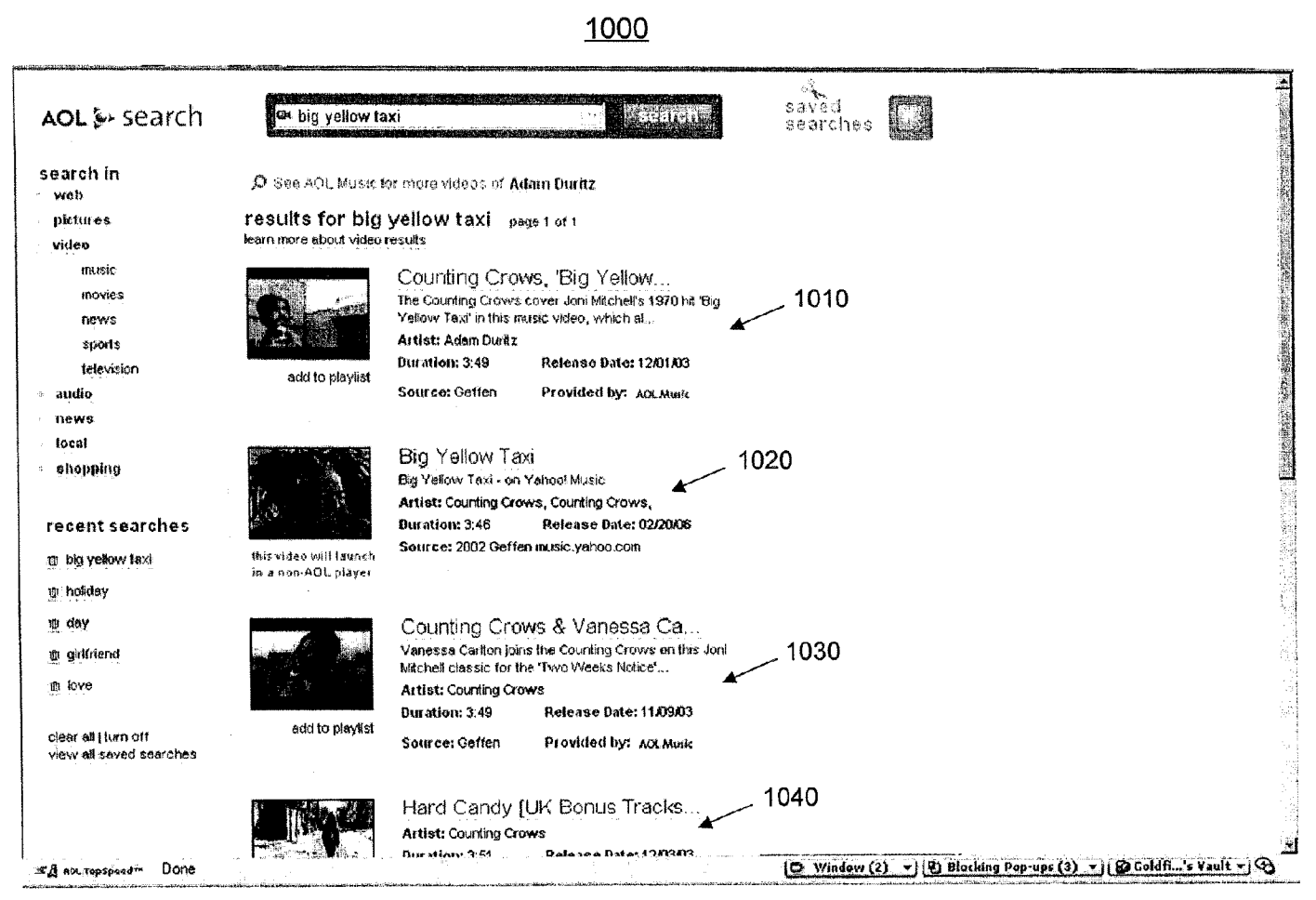
Figure 11:
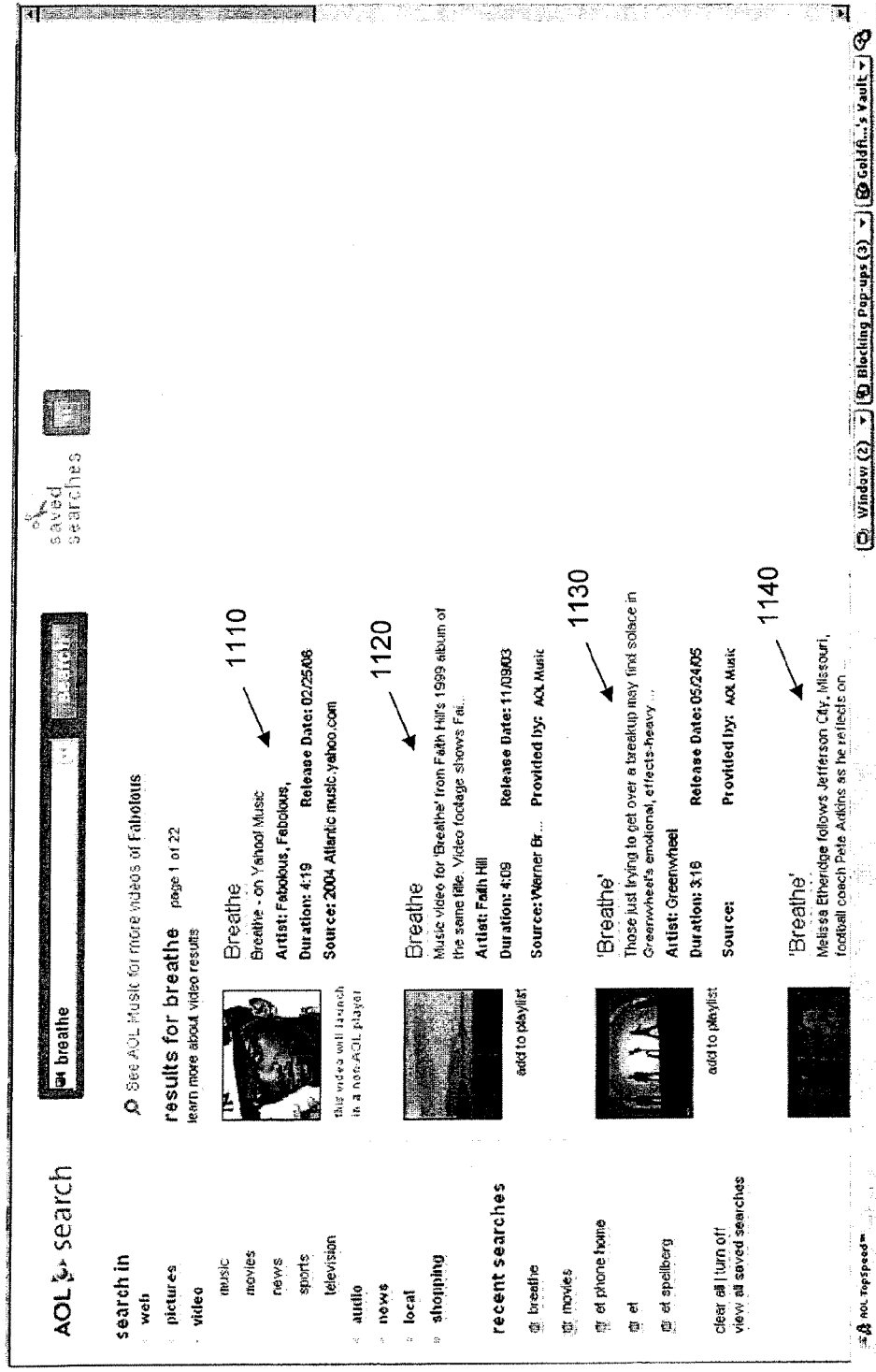
Figure 12:
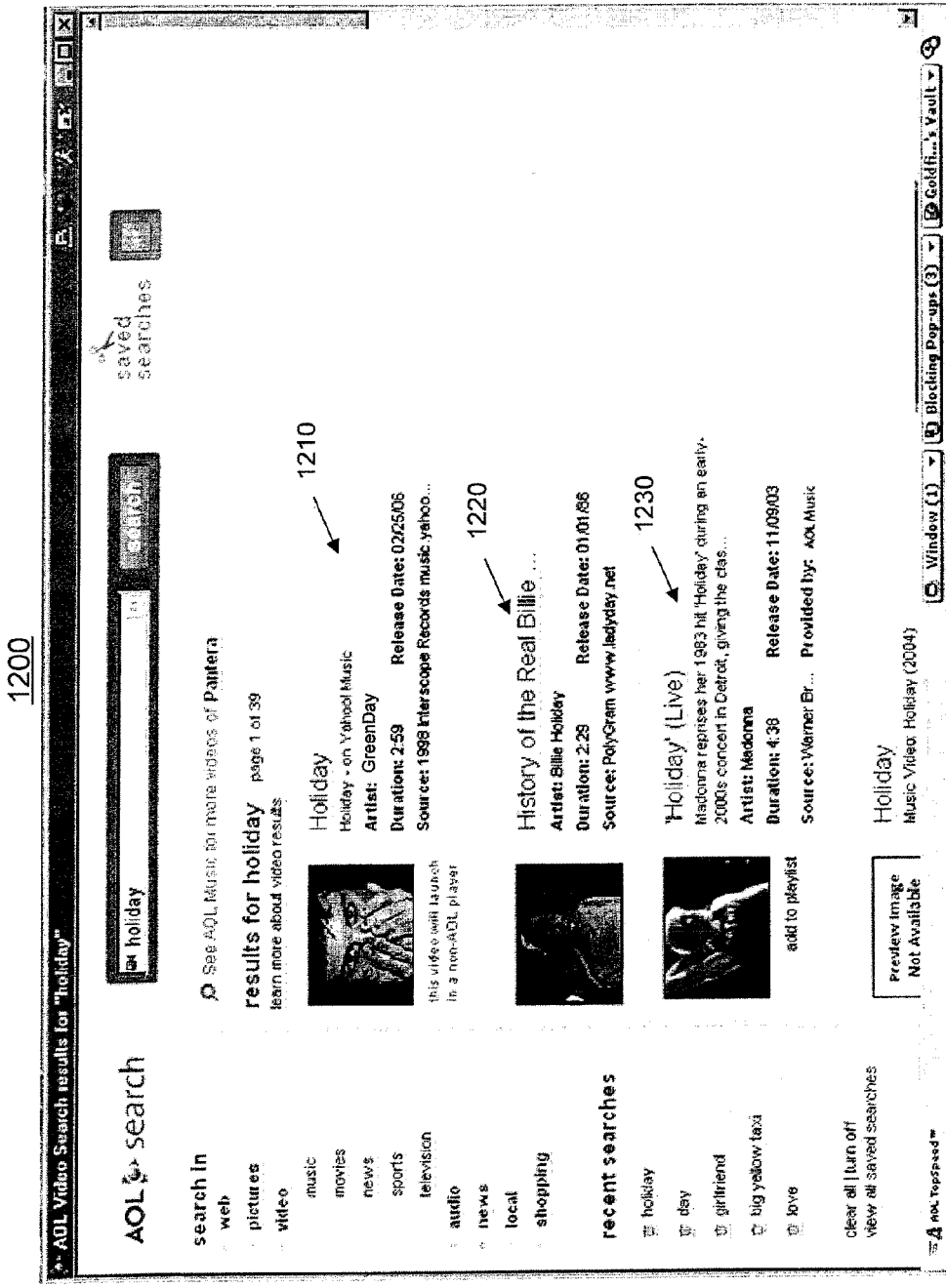

GUIs 1000-1200 of FIGS. 10-12, respectively, are structured and arranged to provide video search results based on popularity of songs associated with the video search results. Perceived popularity for the songs may be determined using, for example, process 500 of FIG. 5, and may be accessed from a genre-specific catalog, such as, for example, music-specific catalog 800 of FIG. 8.

More particularly, GUI 1000 provides video search results for the search query "Big Yellow Taxi." The search system 130 may determine that a user desires video search results because the user entered the search query "Big Yellow Taxi" into a specialty video search engine or via some other indication.

Search results 1020-1040 are associated with the song "Big Yellow Taxi" as recorded by the artist Counting Crows. The Counting Crows search results 1020-1040 may be provided at the top of the search result list because the popularity of the Counting Crows version of the song may be greater than that of the other artists (e.g., Amy Grant, Joni Mitchell and Pinhead Gunpowder) who have performed the tune. Although search results associated with Counting Crows may be boosted to the top of the search result list, search results associated with other songs having "Big Yellow Taxi" as a title or lyric also may be provided as search results, but at a lower ranked position (not shown). Additionally, or alternatively, video search results 1020-1040 associated with the Counting Crows may be boosted to the top of the search result list because of a popularity for the music video (i.e., a content item that is different from the song content item) for the Counting Crows version of the song, and may not necessarily reflect an overall popularity of the Counting Crows version of the song.

GUI 1100 provides video search results for the search query "Breathe." As shown, video search result 1110 is associated with a song entitled "Breathe" by the artist Fabolous, video search result 1120 is associated with the artist Faith Hill, video search result 1130 is associated with the artist Greenwheel and video search 1140 is associated with the artist Melissa Etheridge. The order in which the video search results 1110-1140 are provided in GUI 1100 indicates a degree of popularity of the videos referred to by each search result. For example, video search result 1110 is provided at the top of the search results list, and thus, may have been determined to be more popular (and more likely to be responsive to the search query) than video search result 1140, which is provided at the bottom of the list. More particularly, and as shown in FIG. 8, the artist Fabolous' version of a song entitled "Breathe" is associated with a perceived popularity of 125, while the Faith Hill version is associated with a perceived popularity of 110 and the Melissa Etheridge version is associated with a perceived popularity of 25.

GUI 1200 provides video search results for the search query "Holiday." As shown, video search result 1210 is associated with the song "Holiday" by the artist Green Day and video search result 1230 is associated with a song of the same name by the artist Madonna. A video search result 1220 associated with the artist Billie Holiday also appears in the search result list because the artist name satisfies the search query "Holiday." Again, the placement of the search results 1210-1230 in the search result list may be based on the popularity of the corresponding music-related item (e.g., particular song, music video for the song or artist) that has been determined to satisfy the search query. For example, the perceived popularity for the Green Day song "Holiday" is 105 as shown in FIG. 8, and the perceived popularity for the Madonna version is 75, as also shown in FIG. 8. As such, the perceived popularity associated with the singer Billy Holiday is between 75 and 105 because search result 1220 is provided in between search results 1210 and 1230.

In addition to a perceived popularity for a content item, other criteria also may be used to rank search results presented in response to a search query provided by a user. In some implementations, information from a user's interest profile also may be used to determine presentation of search results. For example, a user input the search query "Madonna." Based on a perceived popularity, search results that refer to digital instances that describe the singer Madonna may be presented more prominently than search results that refer to digital instances that involve religious connotations for the word "Madonna." However, a user's interest profile may indicate a strong interest in religious iconography. As such, the user's interest profile may be used in combination with, or instead of, perceived popularity in ranking search results for this particular user. When user interest profile information is used in combination with perceived popularity information, and other possible criteria, each of the criteria may be individually weighted to cause one or more of the criteria to have cause a greater or lesser effect on the presentation of the search results. More broadly applied, the concepts described herein may be implemented outside the scope of Internet content searches exclusively yielding web pages. For instances the concepts may be applied to enable determination of popularity for information revealed by the results of searches against file archives or database records (e.g., which also may be referred to as digital instances), where the results are ranked based on a determination of perceived popularity of content items described by, or embodied within, in those digital instances. In one implementation, the perceived popularity for a content item may be contrasted with a with a real popularity (e.g., frequency or absolute number of accesses) of the digital instance itself.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method for providing search results, the method comprising:
   determining, based on a received search query, a first search result and a second search result;
   identifying a first genre related to the first search result and a second genre related to the second search result, the first genre and the second genre being different genres;
   accessing a first genre-specific catalog associated with the first genre and a second genre-specific catalog associated with the second genre;
   determining, using at least one processor, a first content item included in the first genre-specific catalog that is associated with the first search result and a second content item included in the second genre-specific catalog that is associated with the second search result;
   calculating, using the at least one processor, a perceived popularity for the first content item and a perceived popularity for the second content item by performing popularity queries for the first content item and the second content item, the popularity queries formed after receiving the search query;
   determining, using the at least one processor, a presentation of the first search result and the second search result based on the calculated perceived popularity of the first content item and the calculated perceived popularity of the second content item; and
   providing, using the at least one processor, the determined presentation of the first search result and the second search result for display on a device of a user.

2. The method of claim 1, wherein:
   the first genre-specific catalog includes information specifying the perceived popularity of the first content item;
   the second genre-specific catalog includes information specifying the perceived popularity of the second content item; and
   the first genre-specific catalog and the second genre-specific catalog are different catalogs.

3. The method of claim 1, wherein:
   the first search result includes a link to a first digital instance that specifies the first content item; and
   the second search result includes a link to a second digital instance that specifies the second content item.

4. The method of claim 1, wherein the first content item is one of a musical artist, a song, or a music album.

5. The method of claim 1, wherein the perceived popularity of the first content item and the perceived popularity of the second content item are calculated by:
   determining popularity search results for the popularity queries for the first and second content items by crawling the Internet for digital instances that include information that satisfies the popularity queries.

6. The method of claim 5, wherein:
   the perceived popularity of the first content item is calculated based on a number of popularity search results determined for the popularity query for the first content item; and
   the perceived popularity of the second content item is calculated based on a number of popularity search results determined for the popularity.

7. The method of claim 1, wherein identifying a first genre related to the first search result and a second genre related to the second search result includes:
   identifying keywords included in metadata associated with a first digital instance referred to by the first search result; and
   identifying keywords included in metadata associated with a second digital instance referred to by the second search result.

8. The method of claim 5, wherein:
   the popularity query for the first content item includes the first content item and information included in the first genre-specific catalog that is associated with the first content item; and
   the popularity query for the second content item includes the second content item and information included in the second genre-specific catalog that is associated with the second content item. query for the second content item.

9. A non-transitory computer-readable storage medium storing instructions that are executable by at least one processor to cause the at least one processor to execute a method, the method comprising:
   determining, based on a received search query, a first search result and a second search result;
   identifying a first genre related to the first search result and a second genre related to the second search result, the first genre and the second genre being different genres;
   accessing a first genre-specific catalog associated with the first genre and a second genre-specific catalog associated with the second genre;
   determining a first content item included in the first genre-specific catalog that is associated with the first search result and a second content item included in the second genre-specific catalog that is associated with the second search result;
   calculating a perceived popularity for the first content item and a perceived popularity for the second content item by performing popularity queries for the first content item and the second content item, the popularity queries formed after receiving the search query;
   determining a presentation of the first search result and the second search result based on the calculated perceived popularity of the first content item and the calculated perceived popularity of the second content item; and
   providing the determined presentation of the first search result and the second search result for display on a device of a user.

10. The non-transitory computer-readable storage medium of claim 9, wherein:
    the first genre-specific catalog includes information specifying the perceived popularity of the first content item;
    the second genre-specific catalog includes information specifying the perceived popularity of the second content item; and
    the first genre-specific catalog and the second genre-specific catalog are different catalogs.

11. The non-transitory computer-readable storage medium of claim 9, wherein:
    the first search result includes a link to a first digital instance that specifies the first content item; and
    the second search result includes a link to a second digital instance that specifies the second content item.

12. The non-transitory computer-readable storage medium of claim 9, wherein the first content item is one of a musical artist, a song, or a music album.

13. The non-transitory computer-readable storage medium of claim 9, wherein the perceived popularity of the first content item and the perceived popularity of the second content item are calculated by:
  determining popularity search results for the popularity queries for the first and second content items by crawling the Internet for digital instances that include information that satisfy the popularity queries.

14. The non-transitory computer-readable storage medium of claim 13, wherein:
  the perceived popularity of the first content item is calculated based on a number of popularity search results determined for the popularity query for the first content item; and
  the perceived popularity of the second content item is calculated based on a number of popularity search results determined for the popularity query for the second content item.

15. An electronic apparatus, comprising:
  at least one processor; and
  a memory device that stores instructions,
  wherein the at least one processor executes the instructions to:
    determine, based on a received search query, a first search result and a second search result;
    identify a first genre related to the first search result and a second genre related to the second search result, the first genre and the second genre being different genres;
    access a first genre-specific catalog associated with the first genre and a second genre-specific catalog associated with the second genre;
    determine a first content item included in the first genre-specific catalog that is associated with the first search result and a second content item included in the second genre-specific catalog that is associated with the second search result;
    calculate a perceived popularity for the first content item and a perceived popularity for the second content item by performing popularity queries for the first content item and the second content item, the popularity queries formed after receiving the search query;
    determine a presentation of the first search result and the second search result based on the calculated perceived popularity of the first content item and the calculated perceived popularity of the second content item; and
    provide the determined presentation of the first search result and the second search result for display on a device of a user.

16. The electronic apparatus of claim 15, wherein:
  the first genre-specific catalog includes information specifying the perceived popularity of the first content item;
  the second genre-specific catalog includes information specifying the perceived popularity of the second content item; and
  the first genre-specific catalog and the second genre-specific catalog are different catalogs.

17. The electronic apparatus of claim 15, wherein:
  the first search result includes a link to a first digital instance that specifies the first content item; and
  the second search result includes a link to a second digital instance that specifies the second content item.

18. The electronic apparatus of claim 15, wherein the perceived popularity of the first content item and the perceived popularity of the second content item is calculated by:
  determining popularity search results for the popularity queries for the first and second content items by crawling the Internet for digital instances that include information that satisfy the popularity queries.

19. The electronic apparatus of claim 18, wherein:
  the perceived popularity of the first content item is calculated based on a number of popularity search results determined for the popularity query for the first content item; and
  the perceived popularity of the second content item is calculated based on a number of popularity search results determined for the popularity query for the second content item.

* * * * *

UNITED STATES PATENT AND TRADEMARK OFFICE
CERTIFICATE OF CORRECTION

PATENT NO. : 9,317,568 B2  
APPLICATION NO. : 13/750202  
DATED : April 19, 2016  
INVENTOR(S) : Abdur R. Chowdhury et al.

It is certified that error appears in the above-identified patent and that said Letters Patent is hereby corrected as shown below:

In the claims,

Claim 8, Col. 22, Line 19, "query for the second content item." should be deleted.

Signed and Sealed this  
Twelfth Day of July, 2016

Michelle K. Lee  
*Director of the United States Patent and Trademark Office*